INVENTORS
ARTHUR J. GEHRING, JR.
MARVIN JACOBY
TREVOR DRAKE READER

BY
Charles E. English
AGENT

PURE FLUID COMPUTER

Filed June 19, 1963

June 22, 1965 A. J. GEHRING, JR., ETAL 3,190,554

PURE FLUID COMPUTER

Filed June 19, 1963 11 Sheets-Sheet 6

PURE FLUID COMPUTER

Filed June 19, 1963 11 Sheets-Sheet 7

June 22, 1965 A. J. GEHRING, JR., ETAL 3,190,554

PURE FLUID COMPUTER

Filed June 19, 1963 11 Sheets-Sheet 9

3,190,554
PURE FLUID COMPUTER

Arthur J. Gehring, Jr., and Marvin Jacoby, Fort Washington, and Trevor Drake Reader, Wayne, Pa., assignors to Sperry Rand Corporation, New York, N.Y., a corporation of Delaware Filed June 19, 1963, Ser. No. 289,110
26 Claims. (Cl. 235—201)

This invention relates to a pure fluid, digital computer and in particular to a novel internally programmed computer of the above type.

Pure fluid devices of the type utilized by the present invention have many advantages. They are both simple in design and inexpensive in fabrication. They use no moving parts and are therefore almost completely trouble free in operation. This latter feature is of great significance in the digital computer field where trouble free elements are necessary to achieve long periods of uninterrupted operation.

It is accordingly an object of this invention to construct a digital computer utilizing pure fluid elements.

It is another object of this invention to construct a computer which is inexpensive in fabrication and reliable in operation.

It is another object of this invention to construct a fluid computer which is simple in design but readily expandable in data handling capacity.

It is another object of this invention to construct an automatic, internally programmed computer utilizing pure fluid elements.

Others objects and features of this invention will become apparent upon a careful consideration of the following description when taken in conjunction with the accompanying drawings in which.

Figure 1:
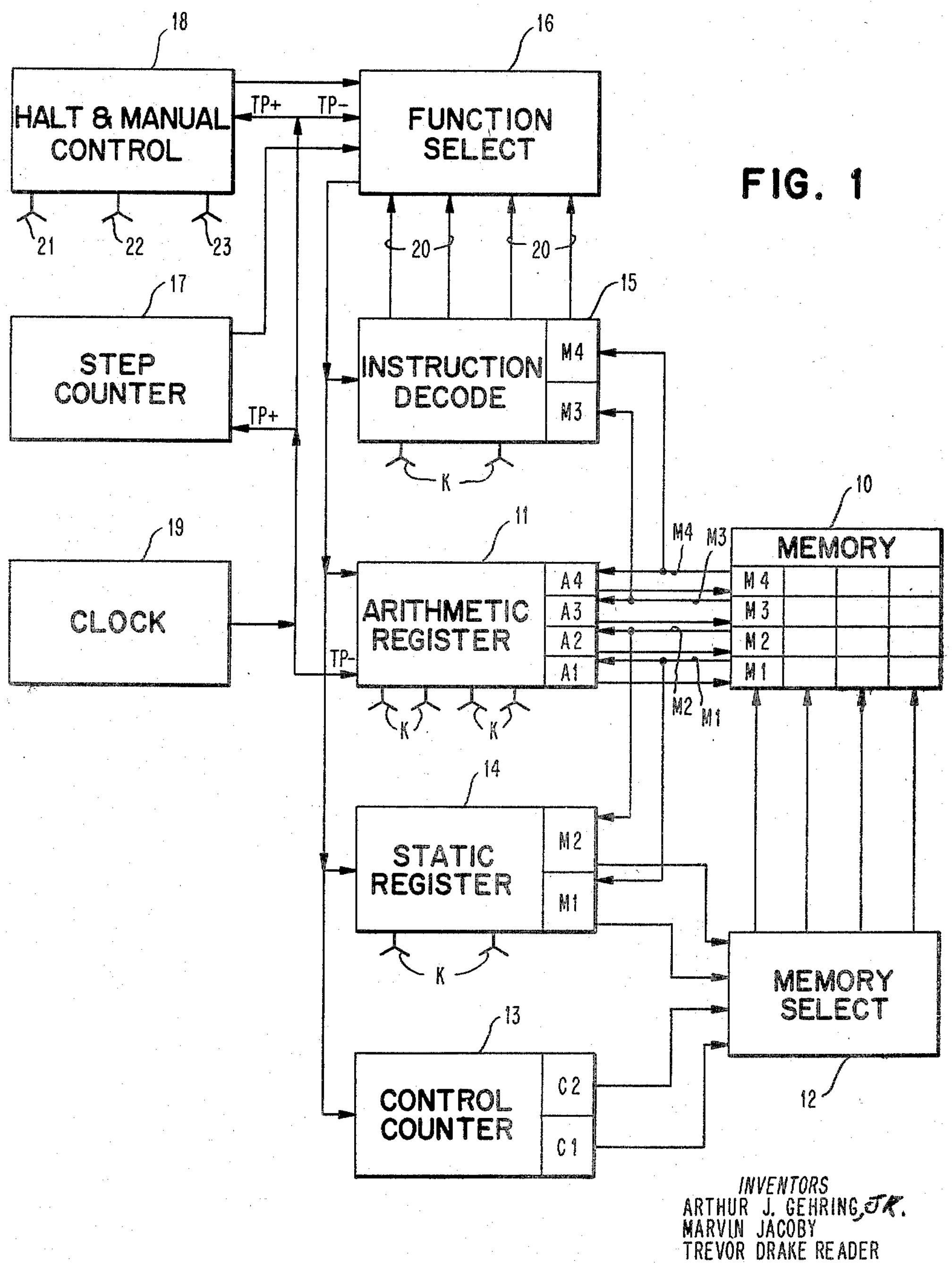
FIGURE 1 is a simplified block diagram showing the major components of the present invention.
Figures 12, 12A:
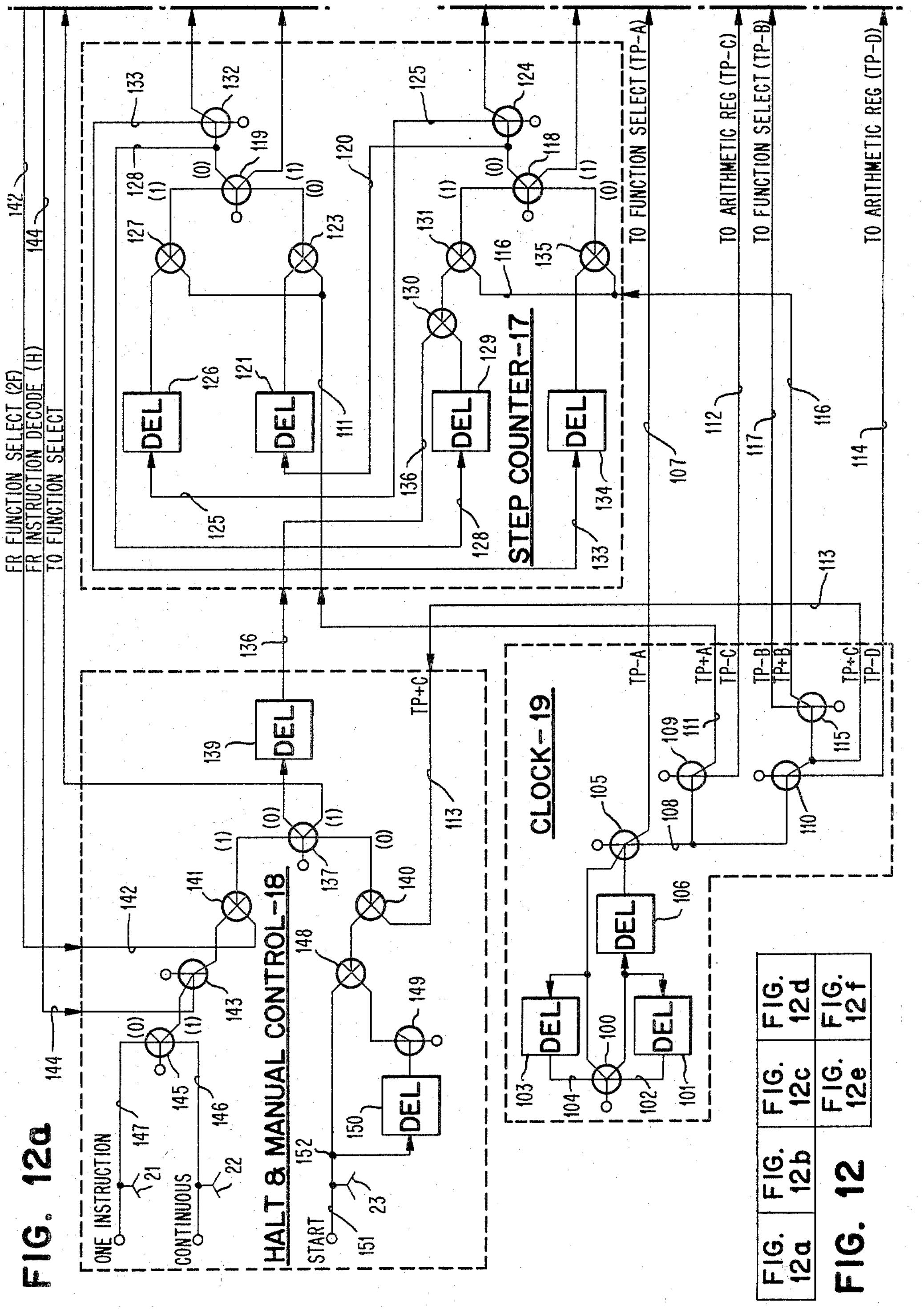

FIGURES 12*a* through 12*f* show in schematic form the details of the computer system of FIGURE 1, while FIGURE 12 shows in plot form the organization of FIGURES 12*a* through 12*f*.

Figure 13:
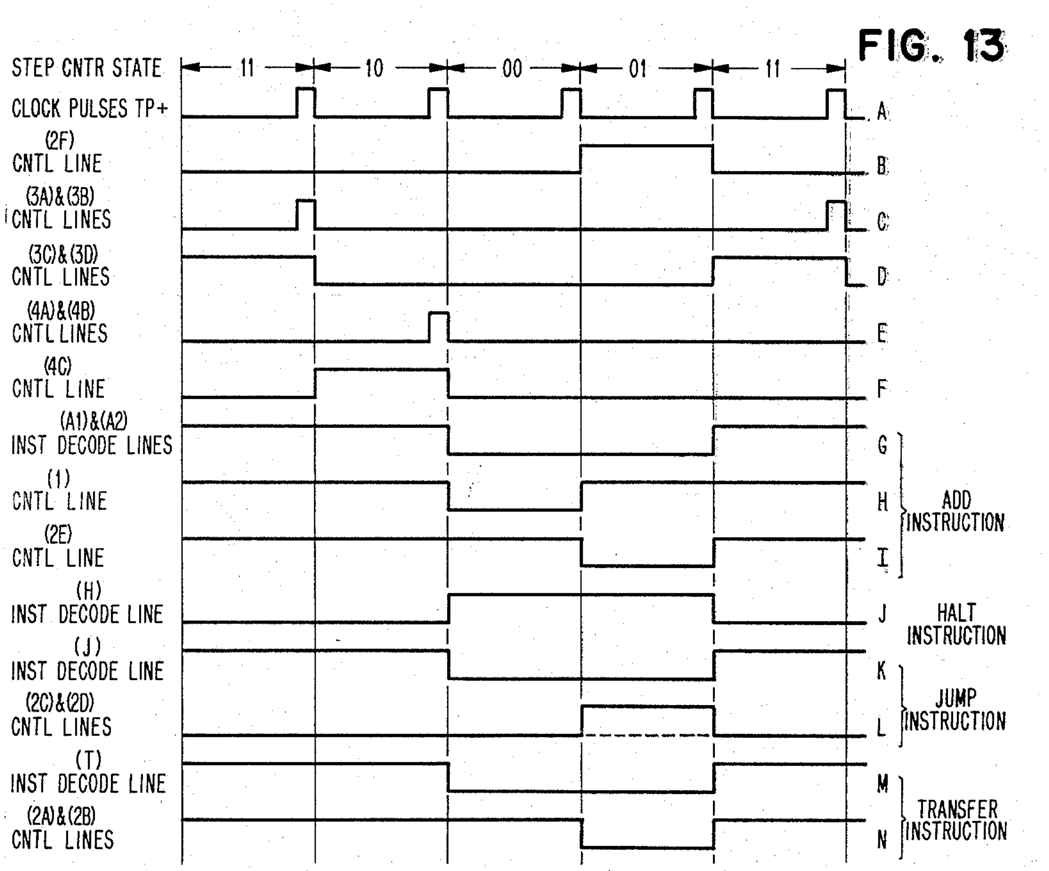
Figure 14:
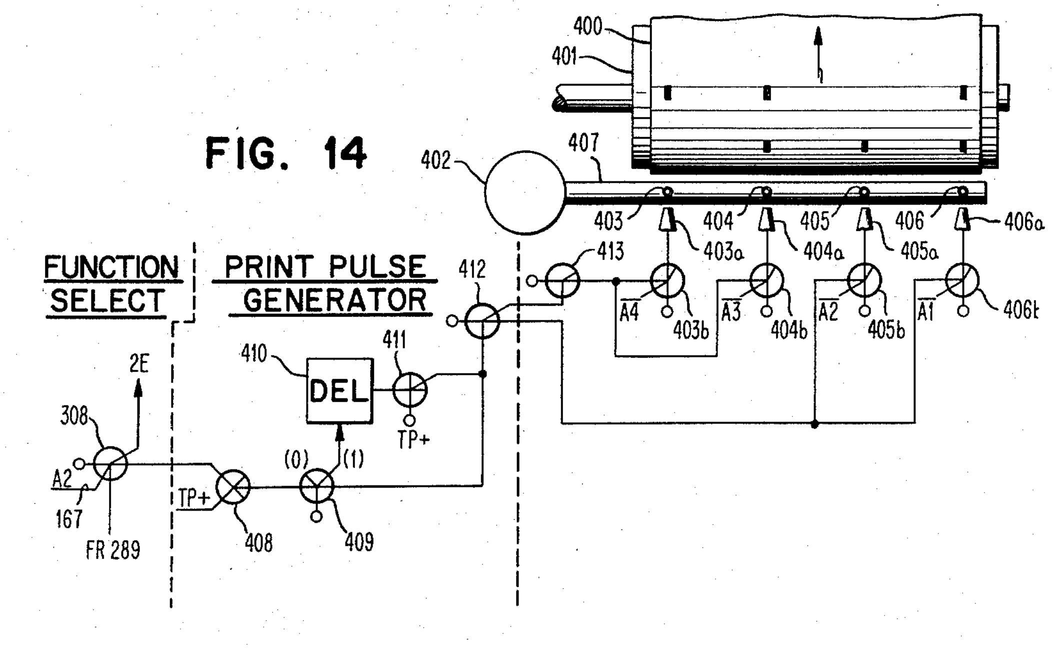

FIGURE 13 is a further set of timing diagrams useful in understanding the operation of the present computer system; and FIGURE 14 shows in partial schematic and in partial diagrammatic form one suitable information output device employed by this invention.

Reference is now made to FIGURE 1. As shown in this figure, the computer comprises a memory section 10 which for the purposes of simplification is hereinafter assumed to have a capacity of four words. The Memory 10 is used to store both instruction words and data words which again for purposes of simplification are hereinafter assumed to comprise four binary bits each. Accordingly, the word format will appear to be composed of four binary bits designated from left to right as M4, M3, M2, M1; where M4 is the most significant bit, M3 the second most significant bit; M2 the next to least significant bit, and M1 the least significant bit. In FIGURE 1, the four bits of a stored word are shown for drawing ease arranged vertically and the memory is shown divided into four vertical columns of four rows each. Each vertical column represents a different word of storage and each row represents the corresponding bit positions of each word. For example, the top row represents the M4 bit of each word stored in the memory, the second row the M3 bit and so on.

The four binary bits of a data word can be used to represent decimal values ranging from zero (0000) to 15 (1111). In the instruction word, the two least significant bits M2 and M1 represent a memory address used in an instruction; and the two most significant bits M4 and M3 identify the operation to be performed by the instruction. Thus, in the present example, the two least significant bits M2 and M1 are used to represent any one of the four addresses in the memory; while the two instruction bits M4 and M3 are used to represent any one of four instructions.

A typical four instruction repertoire for the illustrated computer is set forth by the table below:

TABLE

| | Symbol | Instruction | Code M4 | Code M3 | Address | Definition |
|---|---|---|---|---|---|---|
| 1 | H | Halt | 0 | 0 | M | Stop computer |
| 2 | Am | ADD | 0 | 1 | M | (A)+(M)⟶A |
| 3 | Tm | Transfer | 1 | 0 | M | (A)⟶M |
| 4 | Jm | Jump | 1 | 1 | M | (M+1)⟶C if A≠0 Otherwise C+1⟶C |

In the above table, the abbreviated designation $(A)+(M)\rightarrow A$, signifies that the word stored in the Memory Address designated by M is to be added to the contents of the A Register (also designated the Arithmetic Register) and the result is to be stored in the A Register. The abbreviated designation $(A)\rightarrow M$ signifies that the contents of the A Register is to be stored in the Memory Address designated by M. Finally, the shorthand designation, $(M+1)\rightarrow$ if $A\neq 0$ otherwise $C+1\rightarrow C$, signifies that the next instruction will be found in the Memory at the address designated $(M+1)$ if the contents of the A Register is not zero, but if the contents of the A Register is zero then the next instruction will be found in the Memory at the address immediately following the address of the present instruction.

The significance and the manner in which these instructions are carried out will be dealt with in detail hereinafter. Before proceeding further with the description of FIGURE 1, however, it should be expressly understood that the memory capacity and instruction repertoire has been purposely limited in order to facilitate the description of the novel concepts embraced by the present invention. It should be equally well understood, that by increasing the size of the computer word from its present 4 bit minimum, both the word capacity of the Memory and the range of instructions performed by the computer can be increased by any desired amount. For example, the number of instructions which can be performed by the computer corresponds to the function $2^N$ where N corresponds to the number of binary bits in the instruction word used to represent the operation to be performed by instruction. Likewise, the number of memory locations in the memory also corresponds to the function $2^N$ where N corresponds to the number of bits in the instruction word used to represent memory addresses. Thus if the word size is increased by two bits, one bit in the instruction portion of a word and one bit in the address portion of a word; then an instruction repertoire of 8 instructions and a memory capacity of 8 words would be possible.

Continuing now with the description of FIGURE 1, the reference character 11 represents a four bit binary Arithmetic Register which is so connected to the Memory as to receive information from the Memory or to transmit information thereto as called for by the operation of the computer. The Arithmetic Register, or A Register as it is called, corresponds to the main arithmetic element of the computer. It has the property of adding an operand received from the Memory 10 to the contents previously stored in the A Register and of storing the result of such addition. The A Register also includes a keyboard input represented by the letters K for manually inserting data therein by an operator.

Reference character 12, labeled "Memory Select" corresponds to the memory addressing element of the computer. This element functions to select an address location in the Memory 10 into which a computer word may be stored or from which a computer word may be read. This element is driven from a Control Counter 13 or a Static Register 14. The Control Counter 13 is, in this embodiment where a four word memory is assumed a scale-of-four counter which is advanced automatically one count at the completion of each instruction. In other words the Control Counter 13 normally functions to address the memory for the next instruction to be performed. Control Counter 13 is therefore the device which normally sequences the computer through its instruction routine. The Static Register 14 is, in the present example, a two bit storage register for storing the M2 and M1 bits of an instruction word. This device is used to provide the address selection information used by an instruction word. This register like the A Register has a keyboard input represented by the letters K by which an operator may manually load address information directly into this register whenever desired.

Block 15, labeled "Instruction Decode," also includes in the present example, a two bit storage register in which the function digits M4 and M3 of an instruction word may be stored. The two function bits stored in the decode Register 15 are decoded to provide a signal on one of four instruction lines 20; one line for each of the four instructions comprising the repertoire of the computer. The Decode Register 15 also has a keyboard input labeled K by which an operator may manually load into this element any of the four instructions of the computer.

The four lines of output from the instruction Decode 15 are fed to a "Function Select" element 16 which together with a Step Counter 17 controls the normal sequence of operations of the various computer components during the performance of instructions. Again in the present example the Step Counter 17 is a scale-of- four counter which is normally stepped periodically through its four states during the execution of an instruction.

The final two components shown in FIGURE 1 are the Clock Generator 19 and the Manual Control block 18. This latter component provides the equipment necessary to starting the computer and to controlling its mode of operation. To this end component 18 includes two mode keys 21 and 22 and a "start" key 23. The mode key 21 operates as a "one instruction" key while key 22 operates as a "continuous" mode key. Actuation of the "one instruction" key 21 will upon actuation of the "start" key 23 cause the computer to perform one instruction and then halt. Actuation of the "continuous" key 22 will upon further actuation of the "start" key 23 cause the computer to operate continuously progressing from one instruction to the next.

The Clock 19 is a pulse generator which provides periodic short duration pressure pulses on a plurality of output lines. Typically, these clock pulses will have a duration of 20 milliseconds and a repetition rate of 4 cycles per seccond. Some of the output lines from the clock are normally in a high pressure state and drop to a low pressure condition during the clock time. These lines are labeled TP−; the minus sign indicating that the pressure drops low during the clock pulses. Conversely, others of the output lines from the clock are normally at a low pressure level except during clock pulse time when the pressure rises to a high state. These lines are labeled TP+; the plus sign indicating that the pressure rises to a high level during the clock time.

Figure 2:
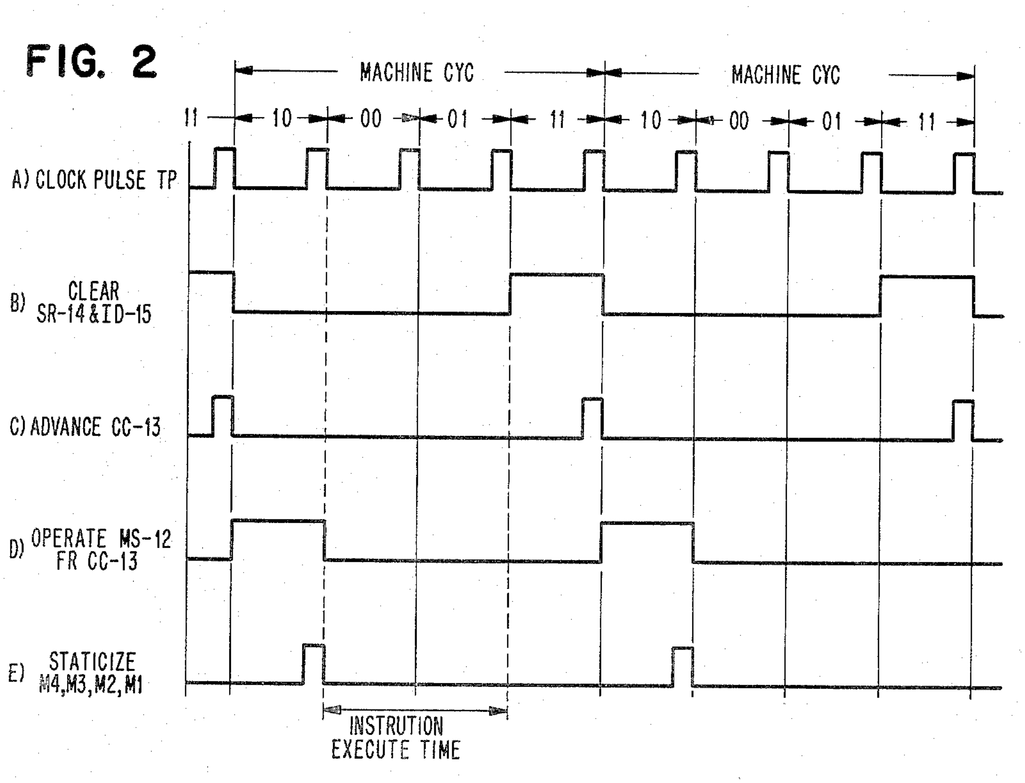
FIGURE 2 is a set of timing diagrams useful in explaining the operation of the computer system described herein.

Before proceeding with the more detailed description of the construction of the computer and its various components, the basic operating cycle of the computer will briefly be described by reference to FIGURE 2. As shown in FIGURE 2, the machine cycle, that is, the interval required to perform an instruction, is made up of the four steps of the Step Counter 17. Step Counter 17 is stepped through its four states one step at a time by the successive pulses from the Clock Generator 19. The pulses from the clock which step the Step Counter are shown in Waveform A of this figure. As indicated immediately above Waveform A, the Step Counter 17 is cyclically advanced according to the Gray code through its four states, 11, 10, 00, 01, 11, etc. The Gray code is used for ease in construction of the counter itself. The machine cycle is also indicated above Waveform A as comprising all four states of the step counter.

As shown in Waveform B, FIGURE 2, the Function Select 16 in conjunction with the Step Counter 17 generates a cyclical clearing signal which clears the Static Register 14 and Instruction Decode 15 during the 11 state of the Counter 17. In other words, the clearing signal clears the components 14 and 15 in preparation for the receipt of the next instruction from the Memory. At the end of the 11 state of the Step Counter, the Function Select 16 generates an advance signal for the Control Counter 13 as shown by Waveform C. The function of Waveform C is therefore to increase the count in the Control Counter 13 by one in preparation for obtaining from the Memory the next instruction to be executed. The Step Counter 17 is then stepped to its 10 state. During this period the Function Select 16 in conjunction with the Step Counter 17 generates the Waveform D which operates to gate the Control Counter 13 reading into the Memory Select 12 which in turn reads the next instruction out of the Memory 10 onto the M4 to M1 output lines of the Memory. At the end of this period, the Function Select 16 generates a gating signal as shown in Waveform E which gates the instruction now being read out on the memory output lines into the Instruction Decode component 15 and the Static Register 14. At the end of this period the Step Counter 17 is stepped to its 00 state which is the first step of an instruction execution period. The instruction execution period covers the 00 and 01 steps of the step counter. Following the 01 step, the Step Counter 17 is advanced to its 11 state during which time the action indicated by Waveforms B and C takes place in preparation for the execution of the next computer instruction.

*Typical fluid devices*

Having briefly described the major components comprising the System, a short description of the typical fluid devices utilized by the present invention will now be given.

Figures 4, 5, 6, 7:
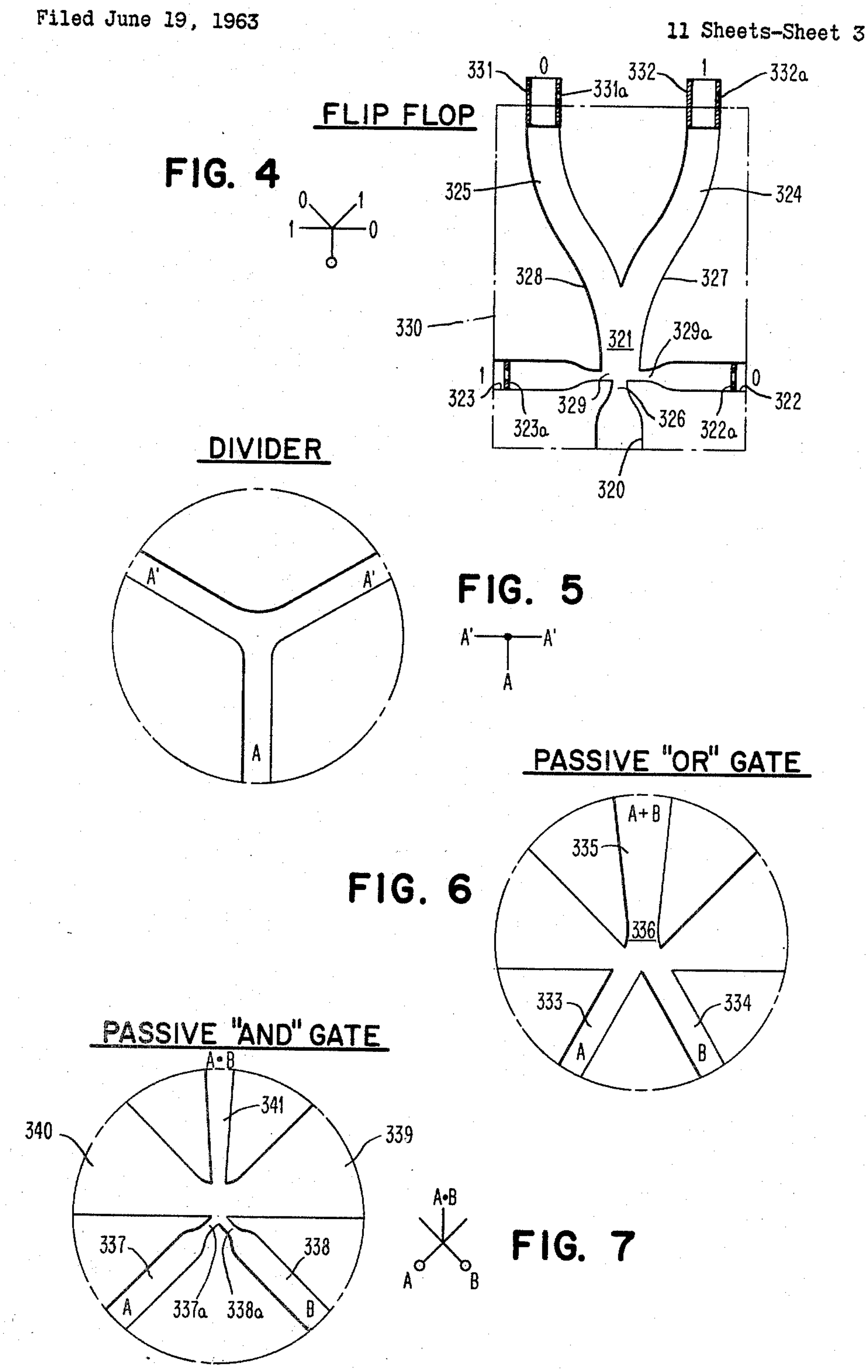
FIGURE 4 shows in diagrammatic form a suitable flip-flop element usable by this invention and the schematic symbol therefor.
FIGURE 5 shows in diagrammatic form a typical pure fluid power divider usable by this invention and the schematic symbol therefor.
FIGURE 6 shows in diagrammatic form a typical passive "OR" gate element usable by this invention.
FIGURE 7 shows in diagrammatic form a typical passive "AND" gate element usable by this invention and the schematic symbol therefor.

Referring first to FIGURE 4 there is shown in simplified diagrammatic form a pure fluid flip-flop device typical of the type of flip-flop used in the present invention. Also shown in this figure is the schematic symbol for such a flip-flop.

As shown in FIGURE 4, the flip-flop is of the type previously described in the literature and in various issued patents such as U.S. Patents 3,001,698 and 3,016,066 to R. W. Warren. It includes a high power input duct 320 which is connected through an interaction chamber 321 to a pair of output ducts 324 and 325. Fluid, such as air or water, is continuously applied under high pressure to the input duct 320. The input duct terminates in a nozzle 326 which converts the high pressure fluid into a high velocity fluid jet which passes through the interaction chamber 321 into one of the output ducts 324 or 325. In more particular, the flip-flop is designed as indicated by the above patents to utilize the "boundary layer lock-on" effect whereby the high velocity jet issuing from the power nozzle 326 attaches itself to one of the output duct side walls 327 or 328 and remains attached to this side wall until dislodged by a control jet applied from one of the transverse control nozzles 329 and 329*a* connected to the input ducts 322 and 323.

As indicated by the dotted line 330 and as described by the above patents, the flip-flop as well as the other fluid elements yet to be described may be made as a laminated structure comprising a top plate, a bottom plate and an intermediate plate. The intermediate plate is tightly secured (glued or clamped) between the top and bottom plates and is channeled or cut to form the various side walls of the flip-flop therein.

The operation of the flip-flop shown in FIGURE 4 as a bi-stable element will now be described. Fluid under high pressure is continuously applied, as will be described, to the power input duct 320. In the present case, air is preferred as the fluid. The power nozzle 326 converts the high pressure fluid into a high velocity jet and directs this jet into the interaction chamber 321. Because of the design of the interaction chamber 321 the "boundary layer lock-on" effect causes the jet to lock onto one of the side walls 327 or 328 whereby fluid will flow out of the corresponding output duct 324 or 325. The output ducts 324 and 325 may, in turn, be coupled to a pair of output lines (flexible hoses for example) through a pair of coupling elements 331 and 332. Each of the coupling elements may typically include a pair of bleed openings 331*a* and 332*a* which are adjusted to control the back loading on the flip-flop and thereby insure stable operation. Porous plugs could be used if desired as described in Patent 3,001,698.

If the power jet is attached to Wall 328 and is therefore flowing out output duct 325, the pressure at the output coupling 331 is high and the flip-flop is said to be set to its binary "0" state as indicated by the associated schematic symbol. The flip-flop will stay in this condition until a high pressure fluid signal is applied to the binary "1" control input duct 323. A high pressure control signal thus applied causes the control nozzle 329 to emit a control jet into the interaction chamber 321 which will impinge upon the power jet and thereby deflect it away from wall 328 onto wall 327. Once the power jet has been dislodged from wall 328 by an input control signal applied to duct 323 the power jet will attach itself to the opposite wall 327 and cause fluid to now flow out the output duct 324. Fluid flowing out this output duct causes the output pressure at the output coupling 332 to rise to a high level whereby the flip-flop is said to be set to its binary "1" state. Now to switch the flip-flop back to its binary "0" state, a high pressure control signal will have to be applied to the binary "0" input duct 322.

Each of the input control ducts 322 and 323 may include an associated orifice 322*a* and 323*a*. These orifices are added to render the control jets less sensitive to pressure changes in the input ducts and to thereby improve the switching stability of the flip-flops. Again these orifices could be replaced, if desired, by porous plugs.

In a typical embodiment, the Control Nozzles 329 and 329*a* and the power nozzle were each made 20 mils wide by 120 mils deep; the control orifices were 30 mils in diameter and the power jets were derived from a source of air pressure operating at 20 inches of water pressure above atmospheric pressure.

The flip-flop is also used as the basic memory cell for storing the binary bits of a memory word. When so used, the orifices 322*a* and 323*a* in the input control ducts 322 and 323 may be reduced in size to about 20 mils in diameter so that normal control pressures applied to the control ducts 322 and 323 during the time that the power jet is flowing will be ineffective to switch the power jet. Switching of the power jet in the memory from one output duct to the other is accomplished by momentarily interrupting the power jet issuing from nozzle 326. When the power jet is so interrupted, the feeble control jets issuing from the control nozzles 329 or 329*a* will be effective to cause the power jet, when it is reestablished, to issue from the appropriate output duct 324 or 325.

FIGURE 5 shows in diagrammatic form a typical fluid flow divider used by the present invention. As indicated in the figure, the flow divider may be a laminated structure similar to the flip-flop, but wherein the center lamination includes a symmetrically formed "Y shaped" duct cut therein. This element is operative so that a pressure level applied to any one leg of the "Y shaped" duct such as A will produce similar or equal pressures at the output (A' and A') of the other two legs. The schematic symbol for this element is as shown.

FIGURE 6 shows in diagrammatic form a passive "OR" gate. It also is typically a laminated structure the center lamination of which is cut to provide a pair of converging input ducts 333 and 334 which converge to a common throat area 336 and then into a common, tapered, output duct 335. A pair of fan shaped release ports may branch off the throat area as shown. The operation of this element is such that a high pressure input A or B applied to either input duct 333 or 334 or both will yield the logical sum on the output duct as indicated by the expression $A+B$ in the drawing.

FIGURE 7 shows in diagrammatic form a fluid passive "AND" gate and its schematic symbol. This element is also made as a laminated structure in which the center laminate is cut to provide the duct work diagrammatically indicated in the figure. In more particular, this element comprises a pair of input ducts 337 and 338 and a common output duct 341. Each of the input ducts terminates in a nozzle 337*a* and 338*a* and are disposed at an angle of approximately 90° relative to one another. The output duct 341 is located opposite the input nozzles along a line which bisects the angle between the input ducts as indicated in the figure. Finally, a pair of fan shaped release ports 339 and 340 are located opposite each of the input nozzles 337*a* and 338*a*.

In operation, a high pressure input A or B to either of the input ducts 337 or 338 alone will produce a high velocity jet from the appropriate nozzle 337*a* or 338*a* which in turn will pass directly out the opposite release port 339 or 340 without materially effecting the output pressure in the output duct 341. Conversely, when substantially equal high pressure inputs are simultaneously present on the input ducts 337 and 338, the resulting jets issuing from nozzles 337*a* and 338*a* combine and flow out the output duct 341 thereby raising the output pressure in the output duct. This device therefore performs the logical product operation A.B as indicated by the associated schematic symbol.

Figure 8:
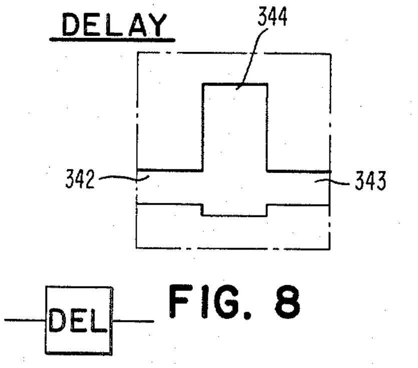
FIGURE 8 shows in diagrammatic form a typical fluid delay element usable by this invention and the schematic symbol therefor.

FIGURE 8 shown in diagrammatic form is a typical fluid delay element used by this invention together with the schematic symbol therefor. As shown, the fluid delay is simply a volumetric tank 344 or the like having an input pipe 342 and an output pipe 343 associated therewith. The operation of this element is as follows: a step change in the input pressure on the input line 342 will appear as a similar change in the output pressure on output line 343 after a delay D. The amount of the delay D is a function of the volume of the tank 344.

The delay tank 344 could be made as a laminated structure in a manner similar to that used in fabricating the other devices or it could, if desired, be a simple length of line.

Figure 9:
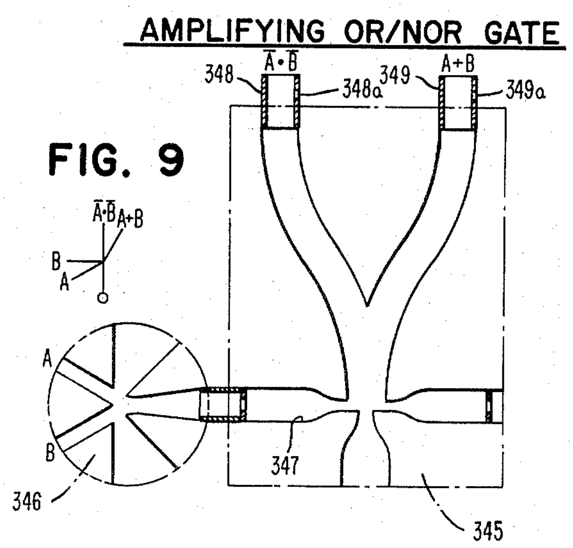
FIGURE 9 shows in diagrammatic form a versatile hybrid fluid element employed by this invention and operable as an amplifier, an inverter, an amplifying "OR" gate or a "NOR" gate and the schematic symbol therefor.

A multi-purpose component which will operate as an amplifier, an inverter, an amplifying "OR" gate or as an amplifying "NOR" gate is shown in diagrammatic form in FIGURE 9 together with its schematic symbol. Referring now to FIGURE 9, it will be seen that this component comprises a flip-flop component 345 to one input 347 of which is coupled a passive "OR" device 346. The flip-flop 345 is made unistable by unbalancing the output loads such as for example by inserting an output orifice 349*a* in the output 349 so that the power jet will normally exit from the output 348.

As thus constructed, the power jet will normally flow out output 348 and will only flow out output 349 during the time a high pressure control signal is applied to the input duct 347. The component therefore, is said to have an inverting output 348 and a non-inverting output 349.

The operation of this component is as follows: a high pressure input signal applied to either input A or B or both of the passive "OR" gate 346 deflects the power jet to output 349. Output 349 therefore yields the logical sum $A+B$, as indicated in the schematic symbol. Conversely, in the absence of a high pressure signal at both input A and B the power jet will flow out output 348. Output 348 will therefore yield the logical "NOR" function $\overline{A.B}$ also as indicated in the schematic symbol.

The "OR" function is therefore derived from the non-inverting output 349 and the "NOR" function from the inverting output 348. The passive "OR" device 346 is used to adopt the component to two inputs. If a single input is to be used, then the "OR" element 346 can be removed and the single input can be applied directly to input duct 347.

Figure 11:
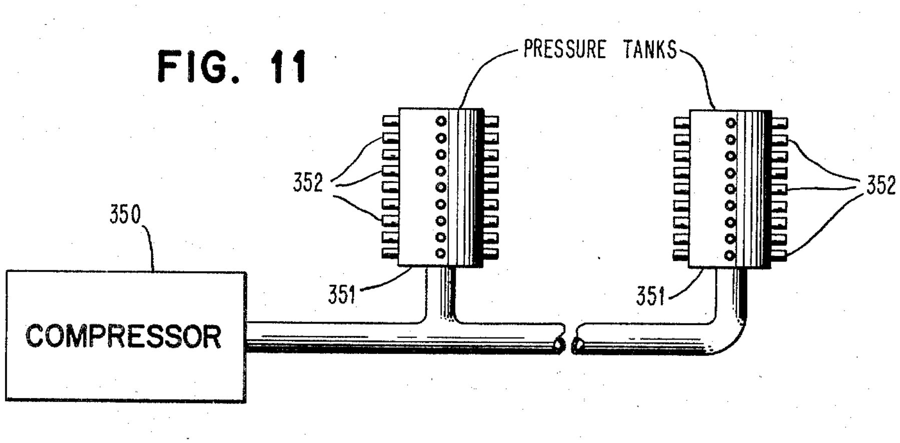
FIGURE 11 shows in diagrammatic form a typical fluid supply source employed by this invention to provide the main power jets for the various fluid elements comprising this invention.

FIGURE 11 shows in diagrammatic form a typical fluid power supply for the computer system of this invention. As indicated, the power supply may comprise a constant high pressure source such as an air compressor 350 which is coupled to a plurality of pressure tanks 351. Each of the tanks in turn comprises a plurality of output nipples or pipes 352 which are in turn coupled by means, not shown, to the input power ducts of the various fluid elements comprising the invention. In a typical example, a pump capable of developing 20 lbs. of pressure was used. The output nipples 352 on tanks 351 were coupled to the power ducts of the various fluid elements through flexible hoses.

Figure 10:
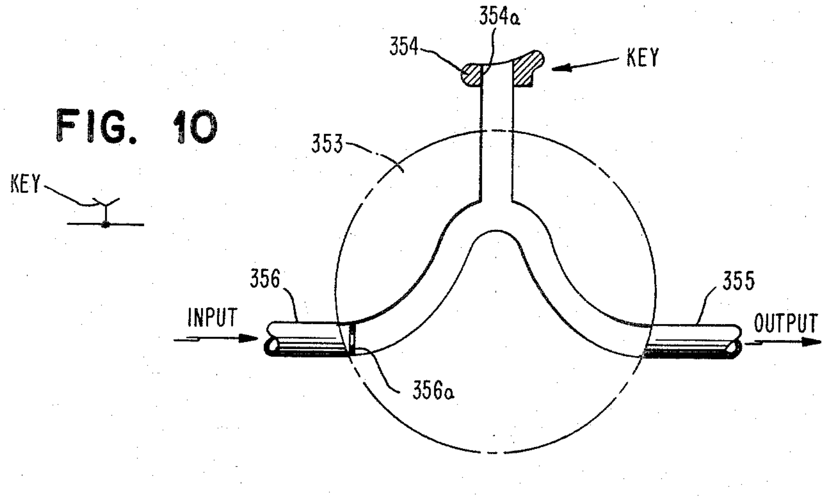
FIGURE 10 shows in diagrammatic form a typical keyboard control key usable by this invention and the schematic symbol therefor.

The final element to be considered before a detailed description is given of the system is the "key set" element shown in FIGURE 10 which is used in the A Register 11, the Manual Control 18 and elsewhere to set the flip-flops in these components. As diagrammatically shown in FIGURE 10, this device simply comprises an input supply line 356 which could be connected at one end to a nipple 352 of a pressure tank 351; an output line 355 which could be connected to an input control duct of the associated flip-flop; and a power divider 353 connecting the lines 355 and 356. The other leg of the divider 353 is connected to an open port 354*a* formed in a finger key 354. The connections between the input 356 and output 355 lines and the divider 353 preferably includes an orifice 356*a* connected in the pressure line 356.

In operation, high pressure is continuously supplied to input line 356. The orifice 356*a* together with the normally open port 354*a* in key 354 permit the pressure in the region downstream from the orifice 356*a* to drop to atmospheric or zero whereby the pressure on the output line 355 is low. When, however, the operator fingers the key 354 thereby closing the port 354*a*, the pressure downstream from the orifice 356*a* rises producing a high pressure on output line 355 to thus trigger the associated flip-flop.

In the above figures the passive "OR" gate, the "AND" gate, the flip-flops, etc. have all been shown as separate laminated elements and it has been suggested that the connection between these elements may be made via flexible hoses. It should be understood, however, that in a refined embodiment a plurality of elements may be supported and interconnected by a single large laminated structure. In this case, the interconnection could be made by forming appropriate channels directly in the center laminate of the large laminated structure.

Also in the illustrations to follow, an element such as a flip-flop or an amplifying "OR/NOR" gate will sometimes be schematically shown as using only one of the outputs therefrom. It will, of course be understood that in these cases the unused output simply exhausts into the atmosphere.

*Clock*

Reference is now made to FIGURES 12*a* through 12*f* where a schematic diagram of a computer embodying the teachings of the present invention is disclosed. These figures should be arranged according to the showing in FIGURE 12 in order to visualize the interconnections of the various components comprising this invention. To clarify the showing in these figures, the interconnections are labelled where appropriate and are equipped with arrowheads to indicate the direction of signal flow. The illustration shown in these figures, utilizes the previously explained symbols to represent the elements used in the construction of the computer. Dotted lines are used to surround the appropriate portions of FIGURES 12*a* through 12*f* to show the correspondence between the components of FIGURE 1 and the components shown in more detail in these figures.

Before describing the operation of the system shown in FIGURES 12*a* through 12*f*, a detailed description of each of the components, such as the Clock 19, the Instruction Decode 16, etc. will be given.

Figure 3:
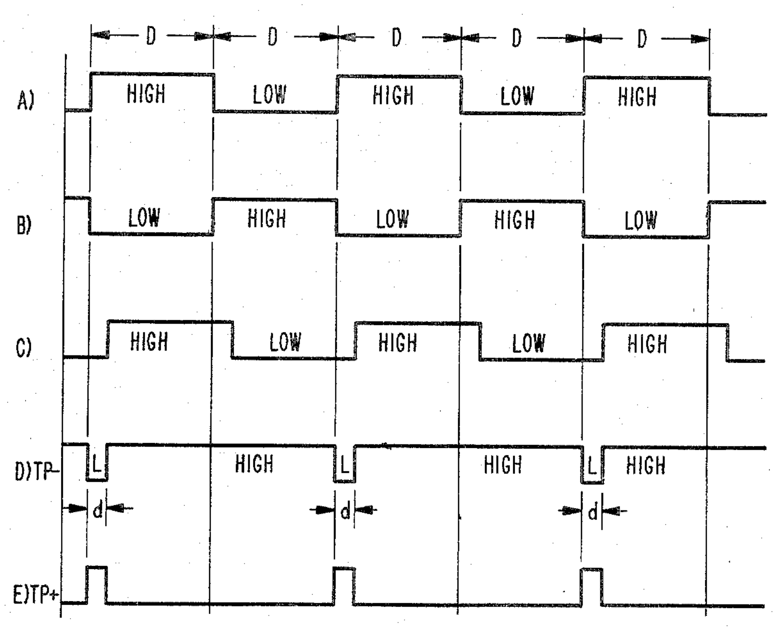
FIGURE 3 is a set of timing diagrams useful in explaining the operations of the clock pulse generator used by the computer system comprising this invention.

Turning now in particular to FIGURE 12*a*, the first such component to be described will be the Clock 19. As shown, the clock comprises the flip-flop element 100 which has its lower output, as viewed in the figure, fed back through a delay element 101 to its lower control nozzle 102. Similarly, the upper output, as viewed in the figure, is fed through a delay element 103 to its upper control nozzle 104. With this interconnection, the normal stable operation of the flip-flop is converted into that of a free running oscillator whose period is a function of the value of the combined delay of the two delay elements 101 and 103. In a typical embodiment the delay elements 101 and 103 could be equal, in which case the output from the flip-flop would be a symmetrical waveform such as shown in FIGURE 3. In FIGURE 3, the waveform A represents the output from the lower output duct or flip-flop 100 while waveform B represents the output from the upper output duct. As indicated in the waveform A, the output pressure from the lower output duct is high for a period equal to the delay D of element 101 and then low for a period equal to the delay D of element 103. The output from the upper output duct as indicated by waveform B is the inverse of that from the lower output duct.

The two outputs from the flip-flop 100 are coupled respectively to the two inputs of an amplifying "OR/NOR" gate 105. The upper output duct of flip-flop 100 is coupled directly to one of the inputs of gate 105 while the lower output duct of flip-flop 100 is coupled through a small delay element 106 to the other input of gate 105. The action of the small delay element 106 is to delay one input to the gate 105 by an amount equal to the desired duration of the clock pulse. The delayed input to gate 105 is thus shown as waveform C of FIGURE 3. The application of pressures on the inputs to gate 105 having the timing and pressure characteristics of waveforms B and C, FIGURE 3, will thus produce at the non-inverting output 107 from gate 105 a pressure signal such as shown in waveform D of FIGURE 3. As herein indicated, the output from line 107 is normally high except that it drops to a low pressure for a period *d* equal to the delay of delay element 106 at a repetition period equal to 2D wherein 2D equals the combined delay of delay elements 101 and 103. Thus the output from line 107 is designated *TP—A*; where the TP— indicates a low pressure level at clock time and the A simply identifies the particular output line 107. The other output of gate 105 appearing on line 108 as shown in waveform E of FIGURE 3 is simply the inverse of waveform D.

The output on line 108 from gate 105 is used to generate other clock pulses both positive (TP+) and negative (TP—) as will now be described. To this end the output on line 108 is applied to a pair of inverters 109 and 110. The first inverter produces in response to the output 108 from gate 105 a positive clock pulse labelled *TP+A* on its non-inverting output line 111 and negative clock pulse labelled *TP—C* on its inverting output line 112. Similarly the second inverter 110 produces a positive clock pulse labelled *TP+C* on its non-inverting output 113 and and a negative clock pulse labelled *TP—D* on its inverting output 114. Finally the non-inverting output from the second inverter 110 is fed to the input of third inverter 115 to produce a positive clock pulse *TP+B* on its non-inverting output 116 and a negative clock pulse labelled *TP—B* on its inverting output 117.

All of the positive and negative clock pulses are synchronous as shown by waveforms D and E of FIGURE 3 and could have been taken directly from the non-inverting and inverting outputs 107 and 108 respectively of gate 105. In such a case a high powered flip-flop 100 and gate 105 would be used and the inverters 109, 110 and 115 eliminated. With the present construction, however, low power elements such as is found throughout the computer can be used. The advantage of the present construction which uses a plurality of inverters to produce all the clock pulses is that standardized, low power elements can be employed throughout the computer.

*Step Counter 17*

The next component to be described will be the Step Counter 17 which is also shown in schematic detail in FIGURE 12*a*. This component, as previously indicated comprises a pair of flip-flops 118 and 119 interconnected so as to form a scale-of-four counter. Also as previously indicated the interconnection between the flip-flops is made so that the counter counts according to the Gray Code. In more particular, the "0" output from the first stage flip-flop 118 of the counter is coupled through line 120, delay element 121, "AND" gate 123 to the "0" input nozzle of the second stage flip-flop 119. The "0" output of flip-flop 118 is also coupled through the inverting output of inverter 124, line 125, delay element 126, "AND" gate 127 to the "1" input nozzle of the flip-flop 119. The other input to the "AND" gates 123 and 127 is taken from the clock line 111 on which a positive clock pulse (TP+) periodically appears. With the recited connection and with the first flip-flop 118 in its "0" state, a high pressure will appear on line 20 to condition "AND" gate 123. Then at clock time a positive clock pulse TP+ will pass through gate 123 to set the second stage flip-flop 119 to its "0" state. Conversely, when the first stage flip-flop 118 is in its "1" state a high pressure output will appear on line 125 from the inverter 124. This will condition "AND" gate 127. Then at clock time a positive clock pulse TP+ will pass through gate 127 to the "1" input of flip-flop 119 to set flip-flop 119 to its "1" state.

The "0" output of the second stage flip-flop 119 is coupled through line 128, delay element 129, a control gate 130, an input "AND" gate 131 to the "1" input nozzle of the first stage flip-flop 118. The "0" output from flip-flop 119 is also fed through the inverting output of an inverter 132, line 133, delay element 134, "AND" gate 135 to the "0" input nozzle of flip-flop 118. The other inputs to gates 131 and 135 is taken from the clock line 116 on which a positive clock pulse (TP+) periodically appears.

The function of the control gate 130, as will be described, is to provide a control point for controlling the starting or stopping of the counter from a control line 136. For the time being assume that the pressure on control line 136 is high and that the gate 130 is active.

With the described connection between the output of flip-flop 119 and the input to flip-flop 118, it will be seen that when the flip-flop 119 is in the "0" state, the positive pressure appearing on line 128 will pass through the control gate 130 to condition gate 131. Then at clock time, the TP+ signal on line 116 will pass gate 131 to set flip-flop 118 to its "1" state. Conversely, when flip-flop 119 is in its "1" state, the high pressure output from the inverter 132 will appear on line 133 to condition gate 135. Then at clock time, the positive clock pulse appearing on line 116 will pass gate 135 to set flip-flop 118 to its "0" state.

The switching sequence of the flip-flops 118 and 119 follows the pattern indicated below, where the right-hand bit represents the state of flip-flop 118 and the left-hand bit represents the state of flip-flop 119:

0 0
0 1
1 1
1 0
0 0

From the above pattern it will be seen that only one flip-flop stage at a time changes state. The switching criterion is that flip-flop 119 will be switched to the former state of flip-flop 118 and flip-flop 118 will be switched to the state opposite that formerly held by flip-flop 119 in response to each clock pulse.

Before describing a cycle of operation of the counter, it should be noted that the delay elements 121, 126, 129 and 134 are added to the circuit to prevent double switching of the flip-flops. The delays provided by these elements are generally all equal to one another and are slightly longer than the duration of a clock pulse.

Assuming a starting state of 00 for the flip-flops 118 and 119 and a sustained high pressure level on the control line 136 so that gate 130 is active, the operation of the counter is as follows:

The "0" state of flip-flop 118 conditions gate 123 and the "0" state of flip-flop 119 conditions gate 131 through gate 130. At clock time a positive clock pulse passes through both gates 123 and 131. The clock pulse passing gate 123 has no effect on the state of flip-flop 119 since this pulse would normally try to switch flip-flop 119 to its "0" state and flip-flop 119 is already in the "0" state. The positive clock pulse passing through gate 131 however is effective and operates to switch flip-flop 118 to its "1" state. Thus at the end of the first clock pulse the state of the counter changes from 00 to 01. The "0" state of flip-flop 119 continues to condition gate 131, while the "1" state of flip-flop 118 now conditions gate 127 rather than gate 123. It will be noted, however, that due to the delay 126 gate 127 won't be conditioned until some time after the first clock pulse has terminated. At the second clock pulse time, the clock pulse passing through gate 131 is ineffective to switch flip-flop 118, since flip-flop 118 is already in its "1" state. The clock pulse passing through gate 127, however, is effective to switch flip-flop 119 to its "1" state whereby the counter will now be set to its 11 state. The 11 state of the counter will condition gates 127 and 135 so that upon receipt of the third clock pulse the counter will change to its 10 state. The 10 state conditions gates 123 and 135 so that upon the receipt of the fourth clock pulse the counter will switch back to its 00 state thereby completing the cycle of operation.

*Manual Control 18*

The component used for starting and for controlling the mode of operation assumed by the computer, namely the Manual Control 18, will now be described again by reference to FIGURE 12*a*. This component operates when the computer is to be placed in the continuous mode to apply a continuous high pressure on the control line 136 to thereby continuously condition gate 130 in the Step Counter 17 whereby the Step Counter 17 may be cycled continuously. In the alternative, when the computer is to be placed in the "one instruction" mode, the Manual Control operates to apply high pressure on the line 136 for one cycle of operation of the Step Counter. At the end of a cycle of operation, the pressure on line 136 will drop to its low level to disable gate 130 and to prevent further cycling of the Step Counter until the start key is actuated.

Included in the Manual Control 18 is a control flip-flop 137 the "0" output of which is coupled a delay element 139 to the control line 136 so that whenever flip-flop 137 is set to its "0" state the control gate 130 will be conditioned and the Step Counter 17 will step through its cycle of operation.

The control flip-flop 137 is set to its "0" state by a start circuit which includes an "AND" gate 140 the output of which couples to the "0" control nozzle of the flip-flop 137. One input to the "AND" gate 140 is taken from the positive clock pulse line 113 ($TP+C$) and the other input is taken from the output of a second "AND" gate 148. One input to gate 148 is derived from one output of a divider 152, while the other input to gate 148 is derived from the inverting output of an inverter 149. The input to the inverter 149 is derived from the output of a delay element 150, the input to which is obtained from the second output of divider 152. The input to the divider in turn is derived from a high pressure supply line 151 to which is coupled the start key 23.

The start key 23 provides a pressure escape port for line 151 so that the input pressure to the divider 152 is normally at a low level. When the operator manually activates key 23, the input pressure to the divider 152 rises to its high level state. This actuates gate 148 since the direct input to gate 148 from the divider 152 rises to its high level state and the second input to gate 148 from inverter 149 is normally high. After a period equal to the delay provided by the delay element 150 the high pressure output from the inverting output of inverter 149 ceases and therefore the output from gate 148 ceases. Thus the delay element 150, the inverter 149, the gate 148 and the divider 152 acts as a single pulser circuit which delivers to gate 140 a single positive pressure pulse equal in duration to the delay provided by element 150 upon actuation of the start key 23. This pulse although short in comparison to the time interval an operator would keep his finger on key 23 must be at least slightly greater than the interval between successive clock pulses and somewhat shorter than the interval spanned by four clock pulses.

At clock pulse time during the existence of an output pulse from gate 148 a TP+ clock pulse appearing on line 113 gates through gate 140 to switch the control flip-flop 137 to its "0" state.

Since the step counter is advanced by positive clock pulses and the control flip-flop 137 is set to its "0" state by positive clock pulses, some provision must be made to avoid conditioning gate 130 in the middle of a clock pulse. If this occurred the initial advancing of the step counter may be unreliable. Therefore to avoid this problem the "0" output from flip-flop 137 is fed through a small delay 139 to the gate 130. This delay is preferably just slightly longer than the duration of a clock pulse but shorter than the period between successive clock pulses.

The control flip-flop 137 is set to its "1" state and the operation of the Step Counter 17 interrupted by the resultant removal of high pressure from the control line 136 whenever the "one" instruction key 21 is actuated or whenever a programmed halt instruction is executed. To this end the "1" input nozzle of flip-flop 137 is coupled to the output line of an "AND" gate 141. One input to the "AND" gate 141 is taken from line 142 (also identified as the (2F) line) of the Function Select 16 which line develops a high pressure during each 01 state of the Step Counter 17. The other input to gate 141 is taken from the output of an "OR" gate 143 one input to which is derived from the Halt Line 144 in the Instruction Decode 15. As will be described the Halt Line 144 (also identified as the H line) in the Instruction Decode 15 goes to a high pressure whenever a halt or H instruction is to be performed. Thus during an H instruction, as will be described, line 144 in the Instruction Decode 15 goes high to thereby produce a high pressure output from "OR" gate 143. The high pressure output from gate 143 conditions gate 141, which in turn produces an output to set flip-flop 137 to its "1" state when the Step Counter 17 reaches its 01 count and the pressure on line 142 goes high. Although the control flip-flop 137 will be set to its "1" state when the Step Counter 17 reaches its 01 state, the control flip-flop 137 is ineffective to stop the Step Counter 17 until the latter reaches its 00 state. This delayed control over the Step Counter 17 will be apparent from an inspection of the input gating of the Step Counter itself. More specifically, it will be seen that gate 130 and therefore gate 131 in the Step Counter does not come into play in the normal step counter cycle until the step counter reaches its 00 state.

Returning to the "OR" gate 143, it will be seen that the other input to this gate is derived from the "1" output of the mode control flip-flop 145. Flip-flop 145 is set to its "1" output condition by the manual actuation of the "one instruction" key 21 which is coupled to a high pressure line 147 leading to the "1" input nozzle of flip-flop 145. Actuation of key 21 sets the flip-flop 145 to its "1" state. The high pressure output on the "1" output line of flip-flop 145 produces a high pressure output from the "OR" gate 143 which in turn conditions gate 141. When the Step Counter 17 reaches its 01 state, the high pressure output developed on line 142 of the function select at this time produces an output from gate 141 to set the control flip-flop 137 to its "1" state and to thereby stop the advancing of the Step Counter 17 when the latter reaches its 00 state.

The mode control flip-flop 145 is set to its "0" state by manual actuation of the "continuous" key 22. Key 22 is coupled to a high pressure line 146 which leads to the "0" input nozzle of the mode flip-flop 145. Thus, actuation of key 22 sets flip-flop 145 to its "0" state to thereby remove the output from "OR" gate 143 and to thereby remove the conditioning signal from gate 141.

*Instruction Decoder 15*

Figure 12B:
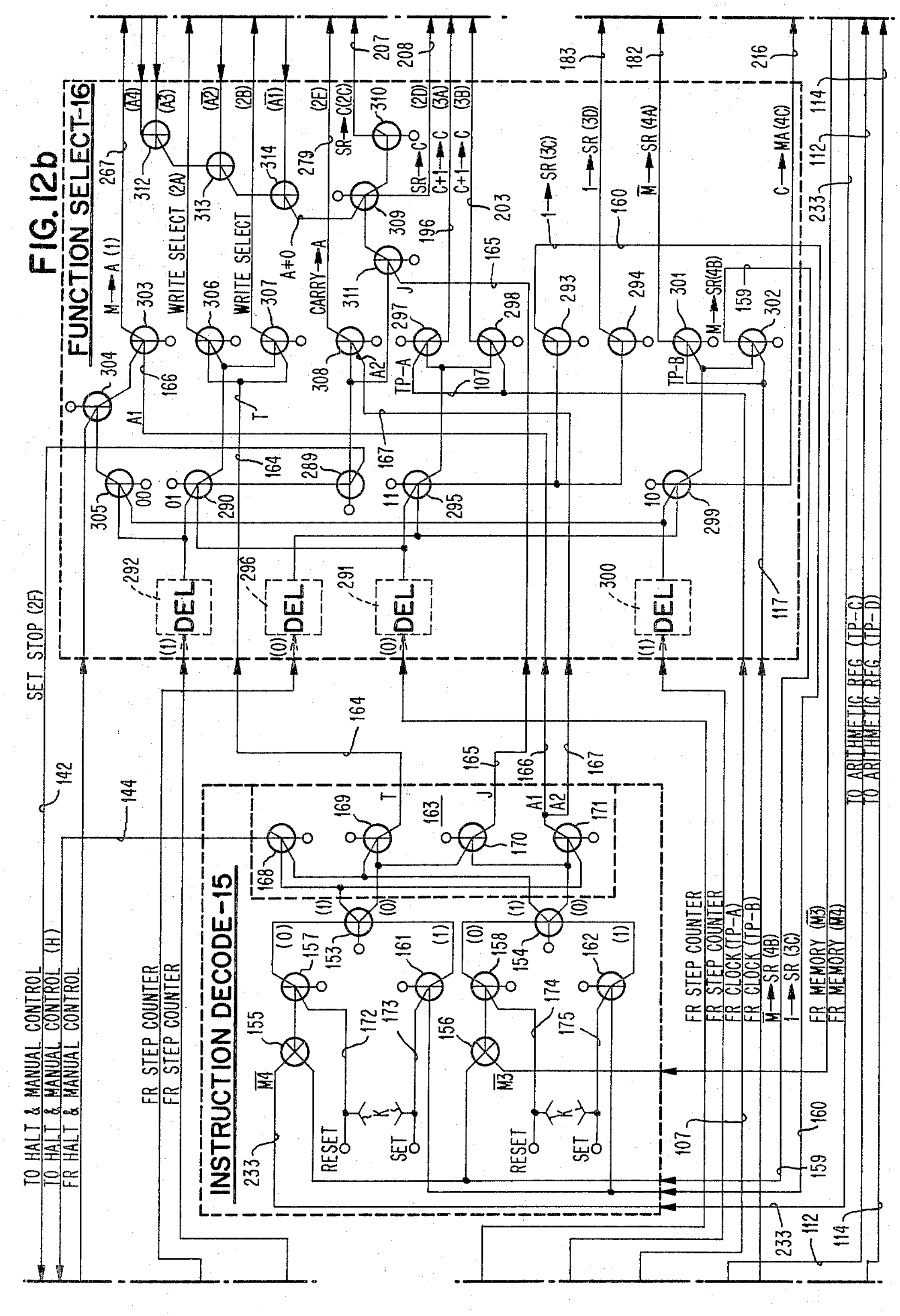

The next component in the overall complex of the computer to be described will be the Instruction Decode 15 which is shown in detail in FIGURE 12*b*.

The Instruction Decode 15 operates to store the instruction bits (M4 and M3 in this case) of an instruction word and to generate a predetermined pressure level on a unique one of a group of control lines for each instruction. Turning now to FIGURE 12*b*, it will be seen that the Instruction Decode 15 comprises a pair of storage flip-flops 153 and 154. Flip-flop 153 is used to store the M4 bit of an instruction word and flip-flop 154 is used to store the M3 bit of the instruction word. The M4 and M3 bits of an instruction word are derived (as will be described) from the output complement lines $\overline{M4}$ and $\overline{M3}$ of the Memory 10 and are fed through a pair of "AND" gates 155 and 156 and then a pair of "OR" gates 157 and 158 to the "0" control nozzle of the flip-flops 153 and 154. The "AND" gates 155 and 156 are conditioned from the (4B) function line 159 of the Function Select 16 as will later be described. The (4B) line develops as shown by Waveform E, FIGURE 2, a high pressure level at clock time during the 10 step of the Step Counter 17. At this instant the instruction bits appearing on the $\overline{M4}$ and $\overline{M3}$ output complement lines of the memory are gated through gates 155 and 156 and thence through "OR" gates 157 and 158 to set the states of flip-flops 153 and 154 according to the instruction code of the instruction next to be performed.

Before the instruction bits are loaded into the flip-flops 153 and 154, these flip-flops are cleared to a reference condition. This is done as shown by Waveform B, FIGURE 2, during the 11 step of the Step Counter 17. During the 11 step of the Step Counter, the Function Select 16 generates, as will be described, a high pressure level on its (3C) function line 160. This high pressure signal on line 160 is fed through a pair of "OR" gates 161 and 162 to the "1" input control nozzles of the flip-flops 153 and 154 to set both of these flip-flops to their "1" state.

The "1" and "0" outputs from the flip-flops 153 and 154 are gated together in a gating matrix shown generally at 163 to selectively produce at the outputs of a plurality of control lines, indicated in general in FIGURE 1 at 20 and in the present figure as lines 144 and 164 through 167, a predetermined pressure level which is used by the computer to control its operation. In more particular, the "1" output from each of the flip-flops 153 and 154 is connected to the respective inputs of an inverter 168, the inverting output from which serves as the Halt (H) Control line 144 for the computer. In operation, when both flip-flops 153 and 154 have been set to their 00 state (M4 M3=00) which is the code for a Halt instruction, both inputs to the inverter 168 will be low whereby, the pressure on line 144 will be high. This high pressure on line 144, as previously described, passes through the "OR" gate 143 in the Manual Control 18 to condition gate 141. Then when the (2F) signal line 142 from the Function Select 16 develops a high pressure during the 01 step of the Step Counter 17, the control flip-flop 137 in the Manual Control 18 will set to its "1" state to disable the Step Counter and halt the computer.

Similarly, the "0" and "1" outputs respectively of flip-flops 153 and 154 couple to the inputs of a second inverter 169, the non-inverting output 164 from which is used to develop a predetermined control pressure during a Transfer or T instruction. In more particular, line 164 is considered to be selected when its pressure is at a low level. This occurs when both inputs to the inverter 169 are at a low level, which in turn occurs when flip-flops 153 and 154 are respectively set to the 10 state (M4 M3=10). This condition develops when a Transfer instruction has been set up in the Instruction Decode 15. During all other setting of flip-flops 153 and 154, the pressure on the output 164 is maintained high.

The 00 outputs from flip-flops 153 and 154 are connected to the inputs of a third inverter 170, the non-inverting output 165 from which is used to develop a selected control pressure during a Jump or J instruction. In more particular control line 165 is considered selected when its pressure is low. This occurs when both inputs to inverter 170 are low or when the flip-flops 153 and 154 are set to their 11 state (M4 M3=11). This condition develops when a Jump instruction has been set up in the Instruction Decode 15. For all other settings of flip-flops 153 and 154, the pressure on line 165 is maintained high.

Finally, the 10 outputs respectively of flip-flops 153 and 154 are coupled to the inputs of a fourth inverter 171, the non-inverting output from which feeds two control lines 166 and 167. These lines are used to develop a selected control pressure during an Add or A instruction. In more particular, lines 166 (A1) and 167 (A2) are considered selected when their pressure is low. This occurs when both inputs to the inverter 171 are low or when the flip-flops 153 and 154 are set respectively to their 01 state (M4 M3=01). This condition develops when an "Add" or A instruction has been set up in the Decode 15. For all other settings of flip-flops 153 and 154 the pressure on lines 166 and 167 is maintained high.

The setting of flip-flops 153 and 154 in addition to being controlled from the $\overline{M4}$ and $\overline{M3}$ memory lines, can also be controlled manually by the keys K. To this end, each of the four keys K couple to four high pressure lines 172 through 175. The outputs from each of these lines are coupled to the input of the respective "OR" gates 157, 161, 158 and 162. The output from these "OR" gates feed to the inputs of flip-flops 153 and 154 whereby manual actuation of any one or two of the keys will set the flip-flops 153 and 154 to any one of their four combinatorial conditions.

*Static Register 14*

The Static Register 14, which in effect is a continuation of the Instruction Decode 15, is the device for storing the M2 and M1 bits (address portion) of an instruction, and will be the next component to be described by reference to FIGURE 12*d*.

Like the Instruction Decode, 15, the Static Register 14 comprises a pair of flip-flops 176 and 177. These flip-flops receive, respectively, the M2 and M1 bits from the complement output lines $\overline{M2}$ and $\overline{M1}$ of the Memory 10 as will be described. The $\overline{M2}$ output line from the Memory 10 is coupled to one input of an "AND" gate 178, the output of which is fed through an "OR" gate 180 to the "0" input nozzle of flip-flop 176. Similarly, the $\overline{M1}$ output line of the Memory 10 is coupled to one input of an "AND" gate 179, the output of which is fed through an "OR" gate 181 to the "0" input nozzle of flip-flop 177. The other input to gates 178 and 179 is derived from the (4A) control line 182 of the Function Select 16. The (4A) control line 182, as will be described, is normally at a low pressure level except at the clock pulse time of the 10 step of the Step Counter 17 as indicated by Waveform E FIGURE 2. At this time, pressure in the (4A) control line 182 rises to a high level and the M2 and M1 instruction bits then appearing on the $\overline{M2}$ and $\overline{M1}$ output lines of Memory 10 will be gated into the flip-flops 176 and 177. The setting of flip-flops 176 and 177 operates, as will be described in detail, through the Memory Select component 12, to select an address in the Memory 10 from which an operand may be read or into which a result may be written.

The Static Register 14 flip-flops 176 and 177 like the Instruction Decode 15 should be cleared to a reference condition before the new M2 and M1 bits are stored therein. The clearing of the Static Register 14 is done by a high pressure signal developed on the (3D) control line 183 of the Function Select 16. This high pressure signal, as indicated by Waveform B, FIGURE 2, is developed, as will be described, during the 11 step of the Step Counter 17 is and fed through the control line 183 and the "OR" gates 184 and 185 to the "1" input nozzles of flip-flops 176 and 177. This signal clears the flip-flops to their 11 state in preparation of the receipt of the M2 and M1 bits of the instruction during the next step of the Step Counter 17.

The setting of flip-flops 176 and 177, in addition to being controlled from the $\overline{M2}$ and $\overline{M1}$ memory lines of Memory 10 can also be controlled manually by the four keys K. Each of these keys K couple to four high pressure lines 186, 186*a*, 187 and 187*a*. The outputs from each of these lines are coupled to the inputs of the "OR"

gates 185, 181, 184 and 180. The output from these "OR" gates feed the inputs of the flip-flops 176 and 177 whereby manual actuation of any one or two of the keys will set up the flip-flops 176 and 177 to any one of their four combinatorial conditions. It is obvious, however, that in the manual actuation of these keys, only one key associated with each of the flips-flops 176 and 177 should be actuated at any given time, since the actuation of both keys of a single flip-flop would produce a cancelling effect one upon the other.

*Control Counter 13*

Before describing how the output of the Static Register 14 is decoded by the Memory Select 12 to address the Memory 10 for purposes of reading an operand therefrom or for writing a result therein, the construction and operation of the Control Counter 13 which is used to address the Memory 10 for instructions will be described by reference to FIGURE 12*d*.

The Control Counter 13 like the Step Counter 17 comprises a pair of flip-flops 188 and 189 which are interconnected so as to form a scale-of-four counter operating to count in the Gray Code.

Figure 12C:
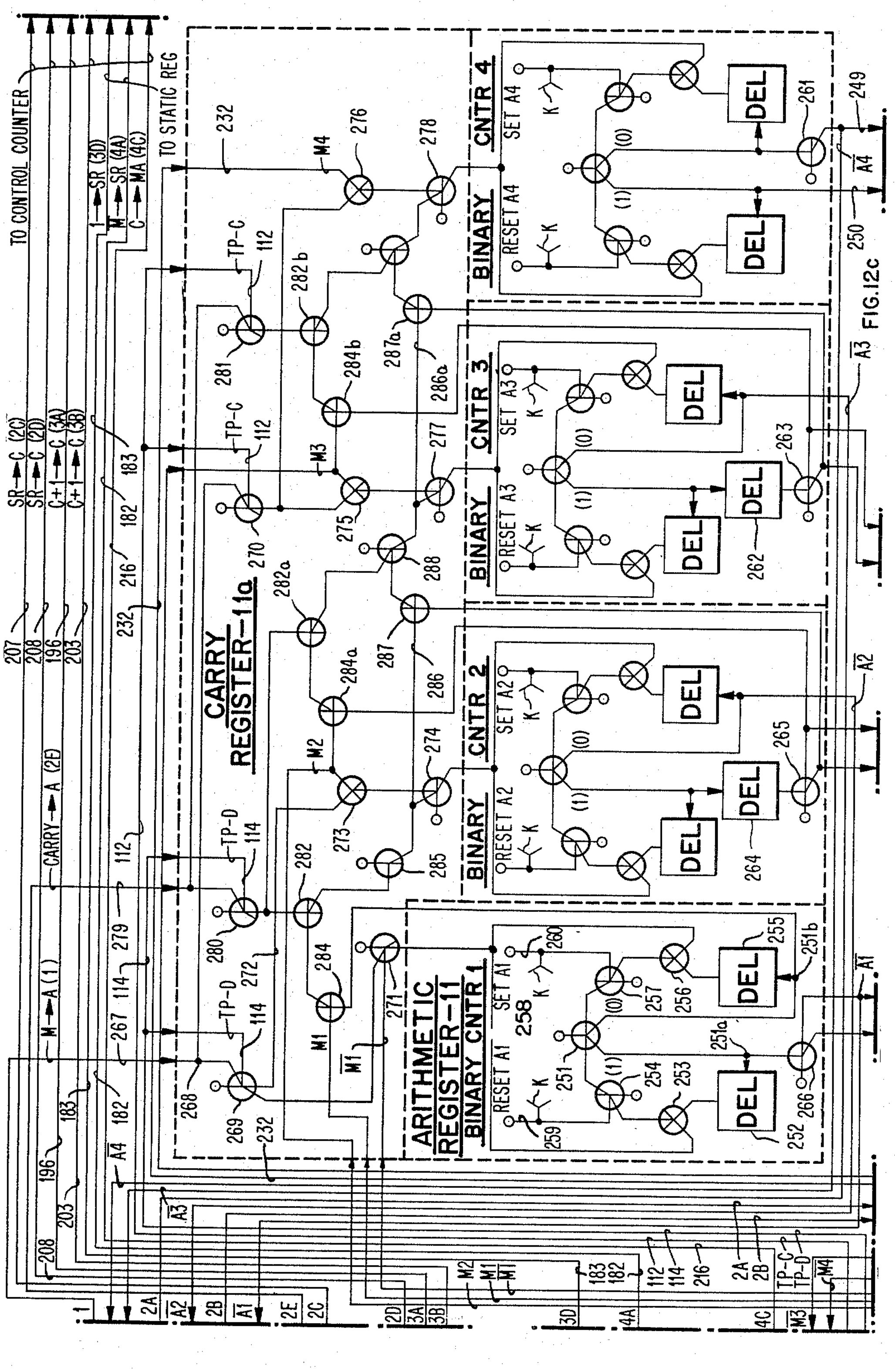
Figure 12D:
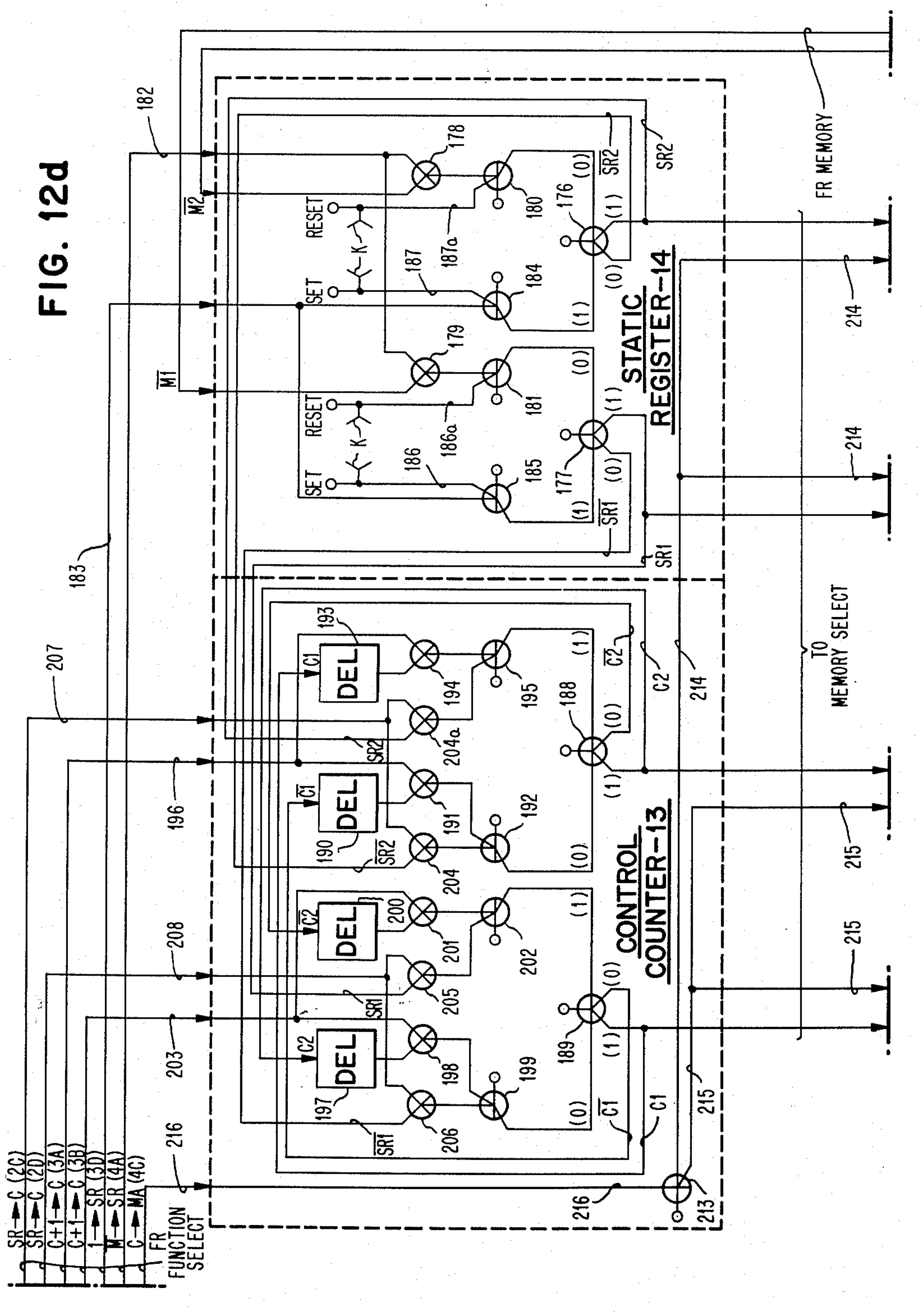

As shown in FIGURE 12*d*, the "0" or $\overline{C1}$ output of the first stage 189 of the Counter 13 is connected through a small delay element 190, "AND" gate 191, "OR" gate 192 to the "0" input of the second stage 188. Similarly, the "1" or C1 output of the first stage 189 is connected through a small delay element 193, "AND" gate 194, and "OR" gate 195 to the "1" input of the second stage 188. The second input to each of the "AND" gates 191 and 194 is obtained from the (3A) control line 196 of the Function Select 16. As indicated by Waveform C of FIGURE 2, the (3A) control line 196, as will be described, develops a high pressure output level once every cycle of the Step Counter 17. This high pressure signal which occurs at clock time every 11 step of Counter 17 operates to switch the second stage of the Counter 13 in dependence upon the existing state of the first stage.

In a manner converse to that just described, the "1" or C2 output of the second stage flip-flop 188 is connected through a small delay element 197, "AND" gate 198 and "OR" gate 199 to the "0" input nozzle of the first stage flip-flop 189. Similarly, the "0" or $\overline{C2}$ output of the second stage flip-flop 188 is connected through a small delay element 200, "AND" gate 201 and "OR" gate 202 to the "1" input of the first stage flip-flop 189. The second input to each of the "AND" gates 198 and 201 is derived from the (3B) control line 203 of the Function Select 16. Again as indicated by Waveform C, FIGURE 2, the (3B) control line 203, as will be described, develops a high pressure signal once every cycle of the Step Counter 17. This high pressure signal which occurs at clock time every 11 step of Counter 17 operates to switch the first stage of the Counter 13 according to the state of the second stage 188.

The purpose of the small delays and their sizes are as described in connection with delays 121, 126, 129 and 134 in the Step Counter 17.

The interconnections of the outputs and inputs of the first and second stages 189 and 188 cause the Counter 13 to switch according to the Gray Code with each of the stepping pulses derived from the (3A) and (3B) control lines of the Function Select 16. In more particular, assume that the Counter 13 is in its 00 state. The "0" or $\overline{C1}$ output of the first stage 189 conditions gate 191 of the second stage 188, and the "0" or $\overline{C2}$ output of the second stage 188 conditions gate 201. The high pressure stepping pulse appearing on lines (3A) and (3B) passes gates 191 and 201. That passing through gate 191 is applied to the "0" input of the flip-flop 188 and is ineffective to switch this flip-flop since this flip-flop is already in its "0" state. That pulse passing gate 201, however, is applied to the "1" input of flip-flop 189 and switches this flip-flop to its "1" state. Thus at the end of the first stepping pulse on lines (3A) and (3B), the Counter 13 is set to its 01 state. The 01 state conditions gates 194 of the second stage and gate 201 of the first stage. The second high pressure stepping pulse appearing on the (3A) and (3B) advance lines thus passes through these gates. That passing gate 201 is ineffective to switch stage 189 because it is already in its "1" state. That passing gate 194, however, is applied to the "1" input of the Second stage flip-flop 188 and switches this stage to its "1" state. Thus at the end of the second stepping pulse Counter 13 is switched to its 11 state. The 11 state of the counter conditions gates 194 in the second stage and 198 in the first stage. Thus the third advance pulse appearing on lines (3A) and (3B) passes these gates to set the counter 13 to its 10 state. The 10 state conditions gates 198 and 191 so that upon receipt of the fourth advance pulse on control lines (3A) and (3B) the counter will step back to its 00 state thereby completing a cycle of operation.

The Control Counter 13 is also adapted to receive through a separate set of control gates the outputs of the Static Register 14. These separate set of control gates are rendered operative when a transfer of control is to be executed as the result of a Jump instruction. In this case, the M2 and M1, or address bits, stored in the Static Register 14 are jammed into the Control Counter 13 whereby the Memory address of the next instruction is dependent upon the address portion of the jump instruction under execution.

In more particular, the "1" or SR2 output and the "0" or $\overline{SR2}$ output of the second stage of the Static Register 14 are applied to "AND" gates 204*a* and 204, respectively, of the second stage of the Control Counter 13. The other input to these gates is taken from the (2C) control line 207 of the Function Select 16. The (2C) control line, as will be described, goes to a high pressure level to condition gates 204*a* and 204 during the execution of a Jump order whenever a transfer of control is to result. The output of gates 204*a* and 204 are applied as respective inputs to the "OR" gates 195 and 192 whereby the "1" or SR2 output of gate 204*a* may be applied to the "1" input of flip-flop 188 and the "0" or $\overline{SR2}$ output of gate 204 may be applied to the "0" input of flip-flop 188.

A similar connection is made between the outputs of the first stage of the Static Register 14 and the first stage of the Control Counter 13. More specifically, the "1" or SR1 output of flip-flop 177 and the "0" or $\overline{SR1}$ output of this flip-flop are coupled respectively to "AND" gates 205 and 206 of the first stage of the Control Counter 13. The second input to these gates is derived from the (2D) control line 208 of the Function Select 16. The (2D) control line develops a high pressure, as will be described, to condition gates 205 and 206 during the execution of a Jump order whenever a transfer of control is to take place. The output of gates 205 and 206 are applied as respective inputs to the "OR" gates 202 and 199 whereby the SR1 or "1" output of flip-flop 177 may be applied to the "1" input of Control Counter flip-flop 189 and the $\overline{SR1}$ or "0" output of flip-flop 177 may be applied to the "0" input of Control Counter flip-flop 189.

*Memory Select 12*

Figure 12E:
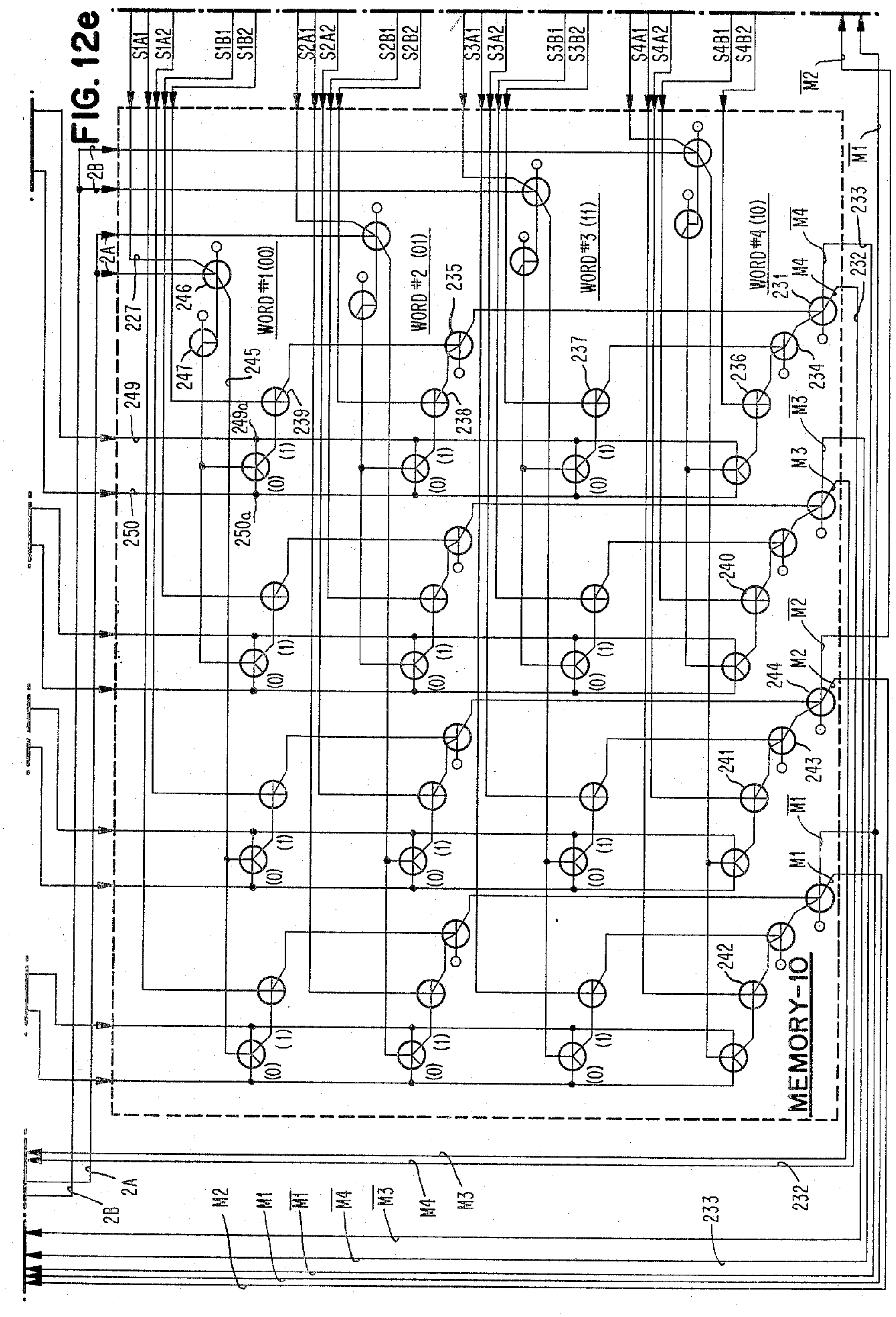
Figure 12F:
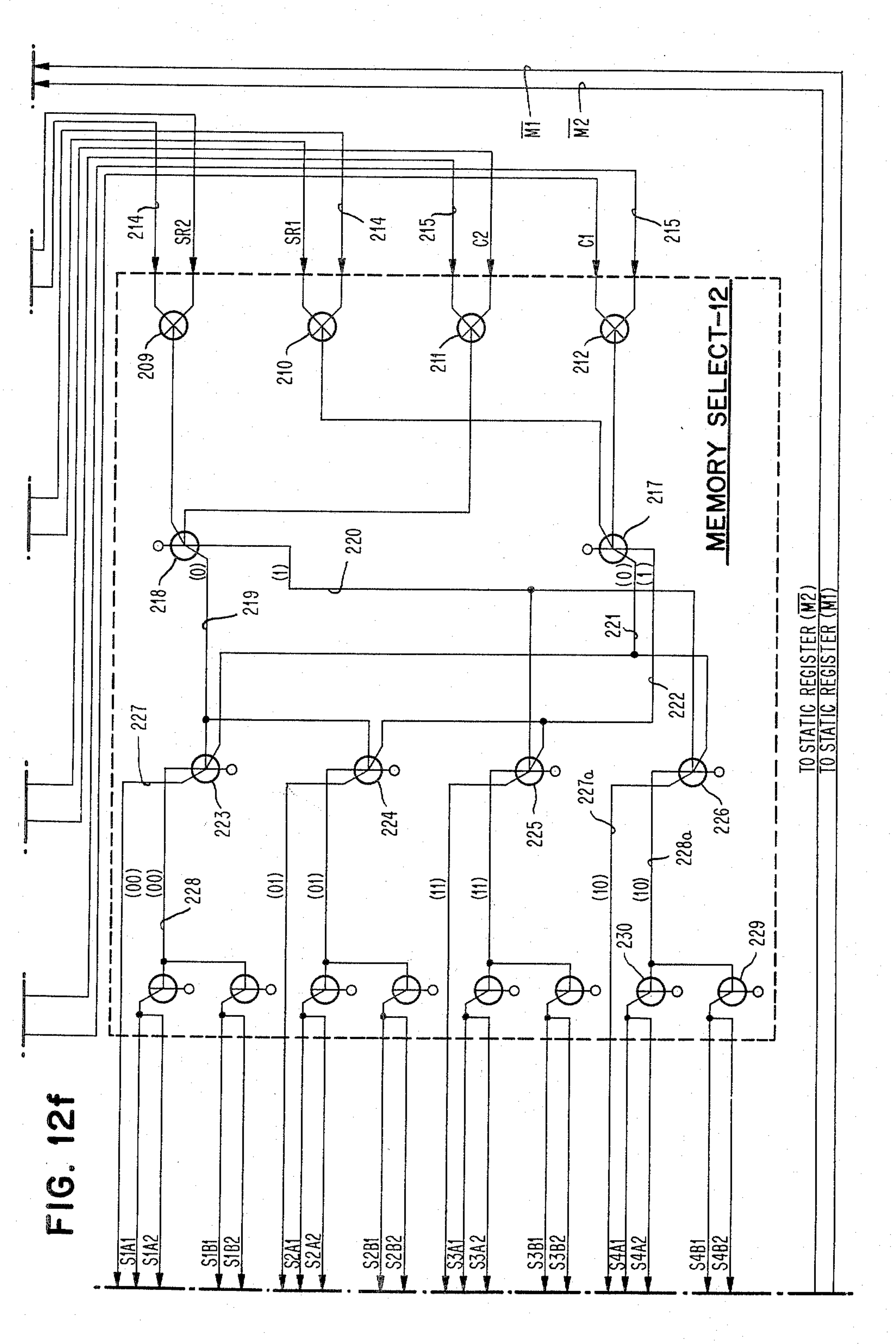

The next component to be described will be the Memory Select 12 which is shown in more detail in FIGURE 12*f*. Reference is now made to this figure together with FIGURE 12*d*.

The Memory Select 12 is a decoding device which is used in addressing the Memory for an instruction or in addressing the Memory for storing an operand therein or for reading an operand therefrom. Instruction addresses are obtained from the output of the Control Counter 13 while operand addresses are obtained from the output of the Static Register 14. Accordingly, the input to the Memory Select 12 includes two sets of input "AND" gates. The first set is used to couple the address information from the Control Counter 13 into the Memory Select 12, and the second set is used to couple the address information from Static Register 14 into the Memory Select 12.

The first set of input "AND" gates to the Memory Select 12 comprises gates 211 and 212. Gate 212 receives as one input thereto, the "1" or C1 output of the first stage 189 of the Control Counter 13, while gate 211 receives as one input thereto, the "1" or C2 output of the second stage 188 of the Control Counter. The other input to these gates is derived from the non-inverting output 215 of an inverter 213. The input to the inverter 213 is derived from the (4C) control line 216 of the Function Select 16. The (4C) control line 216, as will be described and as shown by Waveform D, FIGURE 2, goes high during the 10 step of the Step Counter 17. At all other times, the output pressure on the (4C) control line 216, is low, and the inverting output 214 of inverter 213 is high. During the high pressure condition on the (4C) line 216, however, the non-inverting output 215 of inverter 213 goes high to condition gates 211 and 212 and thereby to gate the outputs from the Control Counter 13 into the Memory Select component 12.

The second set of input "AND" gates to the Memory Select 12 comprises gates 209 and 210. Gate 210 receives as one input thereto, the "1" or SR1 output of the first stage 177 of the Static Register 14, while gate 209 receives as one input thereto, the "1" or SR2 output of the second stage 176 of the Static Register 14. The other input to gates 209 and 210 is derived from the inverting output 214 of inverter 213. The inverting output 214 from inverter 213, being normally high, conditions gates 209 and 210 to thereby gate the output from the Static Register 14 into the Memory Select Component 12.

The output of the input "AND" gates 209 to 212 serve as the inputs to a pair of amplyifying "OR/NOR" gates 217 and 218, with the outputs from gates 210 and 212 providing the input to gate 217 and the outputs from gates 209 and 211 serving as the inputs to gate 218. The gates 217 and 218 each provide two outputs, a non-inverting output 219 for gate 218 and 221 for gate 217 and an inverting output 220 for gate 218 and 222 for gate 217. The four outputs from the two gates 217 and 218 are then finally gated together in four amplifying "OR/NOR" elements 223 to 226 to provide the final line selection for addressing the memory. One gate 223 to 226 for each word address in the memory. In more particular, the non-inverting outputs 219 from gate 218 and 221 for gate 217 connect to the two inputs for gate 223; the non-inverting output 219 from gate 218 and the inverting output 222 from gate 217 connect to the two inputs for gate 224; the inverting outputs 220 from gate 218 and 222 from gate 217 connect to the two inputs for gate 225; and finally the inverting output 220 for gate 217 and non-inverting output 221 from gate 217 connect to the two inputs for gate 226.

The interconnections between gate 217 and 218 and the four final gates 223 to 226 are such that the memory address corresponding to one of the gates 223 to 226 is said to be selected when both inputs to that gate 223 to 226 are in their low pressure states. Each of these gates 223 to 226 provides a non-inverting output and an inverting output. For gate 223, line 227 represents the non-inverting output and 228 the inverting output. When a gate 223 to 226 has been selected its inverting output is at a high pressure level and its non-inverting output is at a low pressure level. All other non-selected gates 223 to 226 have the reverse pressure conditions on their inverting and non-inverting outputs. The high pressure inverting output is used, as hereinafter described, to effect a read out from the selected memory address, while the non-inverting output is used in writing into the selected address.

To illustrate the operation of the Memory Select 12, assume that the (4C) control line 216 is in its high pressure state and that input gates 211 and 212 are conditioned by virtue of the high pressure on line 215 while gates 209 and 210 are non-permissive. Assume also that the Control Counter 13 is in its 00 state. Then from the schedule below the first word in the memory should be selected.

| Bit code: | Word number |
|---|---|
| 00 | 1 |
| 01 | 2 |
| 11 | 3 |
| 10 | 4 |

From the above assumptions it will be seen that the output from all the input "AND" gates 209 through 212 are low and that both inputs to both gates 217 and 218 are in their low pressure states. The non-inverting outputs 219 from gate 218 and 221 from gate 217 are therefore both low and the inverting outputs 220 from gate 218 and 222 from gate 217 are both high. Thus only gate 223 of the group 223 to 226 have both inputs in their low pressure states. All other gates 24 to 226 have at least one high input pressure. Therefore gate 223 is selected to the exclusion of the other gates 224 to 226.

Continuing with the illustration, assume now that the setting of the Control Counter 13 has been advanced to its 01 state and that input gates 211 and 212 are conditioned by a high pressure signal on line 215. In this case, the output pressure from "AND" gate 212 is high and the output pressure from "AND" gates 209 to 211 are all low. Thus in this case, both inputs to gate 218 are low whereby the non-inverting output 219 from this gate is low and its inverting output 220 is high. In the case of gate 217, however, the input thereto from gate 212 is high due to the "1" output from the Control Counter flip-flop 189. This causes the non-inverting output 221 from gate 217 to be high and the inverting output 222 to be low. In this condition only gate 224 will have both of its inputs low and this gate will be selected. All other gates 223, 225 and 226 will have at least one high pressure input and will not therefore be selected. Gate 224 therefore corresponds to word number 2 in the memory.

From the foregoing description, it will be seen that gate 225 (Memory Word 3) is selected when the Bit Input Code to the Memory Select 12 is 11 and finally gate 226 (memory word 4) will be selected when the bit input code to the Memory Select 12 is 10.

The foregoing description assumes that the Memory Select 12 is being actuated by the Control Counter 13; that is the Memory 10 is being addressed for a new instruction. The operation of the Memory Select 12 when the Memory 10 is being addressed for an operand by the Static Register 14 is the same as that described above. In this instance, however, the pressure on line 214 from inverter 213 is high and the input "AND" gates 209 and 210 are conditioned instread of input "AND" gates 211 and 212. This gates the setting of the Static Register 14 into the Memory Select 12 instread of the Control Counter 13 setting.

*Memory 10*

The memory which is shown in FIGURE 12*e* comprises a plurality of groups of flip-flops, one group for each word of storage, with each group comprising a number of flip-flops equal to the number of bits in a word. In the present case where four, four bit words of storage is assumed, the four flip-flops comprising a word of storage are shown in the drawing as arrayed horizontally in a row. There are four such rows disposed vertically in the drawing to show the four words of storage.

Each row is labeled at the right hand end with the two bit code designation used to identify the word number represented by that row. For example, the first or uppermost row which stores word number 1 is designated as 00. Row number 2 and therefore word number 2 is designated by the code 01. Row number 3 and therefore word number 3 is designated by the code 11. And finally row number 4 and therefore word number 4 is designated by code 10.

Further as shown in the drawings, the corresponding bit flip-flop of each word is arrayed for convenience in vertical columns. That is, reading from right to left, the first column of flip-flops all store the 4th bits of the words in storage, the second column from the right, the 3rd bits, etc.

Each of the bit columns has a pair of output lines associated therewith. For example, the lines designated M4 and $\overline{M4}$ are associated with the 4th bit column; the lines designated M3 and $\overline{M3}$ are associated with the 3rd bit column, etc. The unbarred lines lines M4, M3, M2, M1 produce high pressure outputs whenever the corresponding bits in the word being read out of the memory is a binary "1" while the barred lines $\overline{M4}$, $\overline{M3}$, $\overline{M2}$, $\overline{M1}$ produce high pressure outputs whenever the corresponding bits in the word being read out of the memory is a binary "0." Thus if the word being read out of the memory corresponds to 1010, lines M4, $\overline{M3}$, M2 and $\overline{M1}$ would all exhibit a high pressure condition. The other output lines from the memory would all be in their low pressure conditions.

The two outputs from each of the bit columns is provided by a separate amplifying "OR/NOR" gate associated with each bit column. The "OR/NOR" gate 231 associated with the 4th bit column is typical. As shown, the non-inverting output 232 of gate 231 provides the unbarred or M4 output while the inverting output 233 of gate 231 provides the barred or $\overline{M4}$ output. The barred and unbarred outputs from the other bit columns are similarly obtained.

The inputs to the gate 231 are obtained from the outputs of a pair of "OR" gates 234 and 235. The "OR" gate 234 functions to buff the outputs of a pair of output "AND" gates 236 and 237 associated with the last two words of storage into one input of gate 231, while the "OR" gate 235 functions to buff the outputs of "AND" gates 238 and 239 associated with the first two words of storage into the other input of gate 231. In other words, the 4th bit of each of the words in the memory is first fed through a respective "AND" gate 236 to 239 and then thereafter buffed together in "OR" gates 234 and 235 to provide the inputs to the final gate 231. The other three bits of each of the words is similarly handled as indicated in the drawings.

To further illustrate the read-out operation of the memory, each of the binary "1" outputs of the four bits comprising a word is fed to one input of a respective "AND" gate. "AND" gates 236, 240, 241 and 242 associated with word number 4 of the memory are typical. The other inputs to these gates is obtained indirectly from the inverting output of one of the appropriate address selection gates 223 to 226 of the Memory Select 12. More specifically, the second input to gates 236, 240, 241 and 242 are obtained from the outputs amplifiers 229 and 230 which in turn are driven from the inverting output 228*a* of gate 226 in the Memory Select 12. Gate 226, it will be recalled, is said to be selected when the input code to the Memory Select 12 is 10. In this condition, gate 226 produces a high pressure level on its output 228*a*. This in turn produces a high pressure condition on each of the output lines S4A1, S4A2, S4B1, and S4B2 from amplifiers 229 and 230. The four high pressure lines S4A1, S4A2, S4B1 and S4B2 condition gates 236, 240, 241 and 242 of word number 4 in the Memory 10 to thereby read out in parallel the binary bits stored in this memory location.

More specifically, to demonstrate the read out operation, assume again that the word to be read out of the Memory 10 is in word location number 4 (Code 10) and that gate 226 in the Memory Select 12 has therefore been selected and that the signal pressures on lines S4A1, S4A2, S4B1 and SB2 are therefore all high. Read out gates 236, 240, 241 and 242 are therefore all conditioned. The read out gates associated with all the other words in the Memory, however, are not so conditioned. Assume further that the word in memory location 4 is represented by the binary code 1010. The high pressure output from the binary "1" output of the 4th bit flip-flop passes through the conditioned gate 236 and thence through the "OR" gate 234 to produce a high pressure on the M4 line from gate 231. In a similar manner the high pressure output from the 2nd bit flip-flop passes through gate 241 buffer 243 to produce a high pressure output on the M2 line from gate 244. Conversely, the low output pressures from the 1st and 3rd bit flip-flops produce low outputs from the read out gates 242 and 240 thereby causing the $\overline{M3}$ and $\overline{M1}$ lines of the associated final "OR/NOR" gates to be high.

From the foregoing description, it will be seen that a read out from the Memory 10 is controlled by the Memory Select 12 opening up the selected set of read out gates.

To write into the Memory a special memory flip-flop of the type previously described and shown in FIGURE 4 is used for the bit storage elements in the Memory. As hereinbefore indicated, the switching of these elements is controlled by interrupting the main power jet. To this end, the Memory Select 12 operates, whenever it is desired to write into the Memory, to momentarily interrupt the power jets of all the bit storage flip-flops of the selected memory word. The control of the power jets of the memory flip-flops comprising the first word of memory storage is typical and will be described in detail. In more particular, the power jets of the first two bit flip-flops are connected together and to the non-inverting output 245 of an amplifying "OR/NOR" gate 246 while the power jets of the last two bit flip-flops are connected together and to the inverting output of an amplifier 247. The control input for the latter element is derived from the inverting output of the gate 246. The two inputs to the element 246 is obtained from the (2A) control line of the Function Select 16 and from the non-inverting output 227 of the selection gate 223 in the Memory Select 12. Both the (2A) and the (2B) control signals, from the Function Select 16 as will be described, are normally high except during the 01 step of the Step Counter 17 when the computer is executing a transfer or (T) order. During this time the pressure on the (2A) and also the (2B) control lines go to their low pressure level, and the pressure on the line 227 is also low by reason of the operation of gate 223 having been selected. The coincidence of low pressure on the inputs to gate 246 causes the pressure on line 245 from gate 246 and the pressure on the inverting output from inverter 247 to go low, whereby the main power jets to the number 1 memory location flip-flops are interrupted until the Step Counter 17 is advanced to its next state when the pressure on line 245 and the pressure on the inverting output from inverter 247 return to their high level state. The information written into the memory by this action is obtained, as will be described, from the four stages of the Arithmetic or A Register 11. In more particular, the binary "1" input nozzles of all of the 4th bit storage flip-flops are all connected together through suitable dividers such as 249*a* to a line 249 which connects to the binary "1" output of the 4th stage of the A register. Similarly, all of the binary "0" inputs to all of the 4th bit storage flip-flops are all connected together through suitable dividers such as 250*a* and to a line 250 to the binary "0" outputs of the 4th stage of the A register. Similar connections are made between the 1st, 2nd and 3rd bit flip-flops of the memory and the 1st, 2nd and 3rd stages respectively of the A register.

From the foregoing description, it will be seen that even though the outputs from the A register are being continuously applied to the memory flip-flops, information will be written into the memory only during the execution of a transfer or (T) order. That is, the (2A) and (2B) signals are only generated by the Function Select 16 when a transfer order is being executed, and the (2A) and (2B) signals together with the operation of the Memory Select 12 are both necessary to interrupt the main jet to a selected word location in the Memory 10.

*A Register*

Referring to FIGURE 12*c* the A Register 11 and Carry Register 11*a* will now be described.

As shown, the A Register 11 is made up of a plurality of binary counter stages, one stage for each bit of a computer word; in this case there are four stages. These stages are connected together, as will be described, through the Carry Register 11*a* so that the A Register will operate as an accumulator wherein an addend taken from the memory can be added to an augend stored in the A Register and the final result will be accumulated in the A Register.

Each of the stages are similar and only the first stage (that stage which holds the first binary bit of a four binary bit word) will be described in detail. As shown in the drawing, each of the stages includes a flip-flop typified at 251 in the first stage. The binary "1" output duct of the flip-flop is fed to a divider 251*a*. One output of the divider is in turn fed through a small delay element 252, the purpose of which will subsequently be described, to one input of an "AND" gate 253. The output of the "AND" gate 253 is in turn fed through an "OR" gate 254 to the binary "0" input duct of the flip-flop. Similarly, the binary "0" output of the flip-flop is fed through a divider 251*b* and a small delay element 255 to one input of a second "AND" gate 256. The output of the "AND" gate 256 is fed through an "OR" gate 257 to the binary "1" input duct of the flip-flop. The other inputs to the two "AND" gates 253 and 256 are coupled to the two outputs of a divider 258 the input to which serves as the input of the counter stage number 1.

With the described connections, each high input pressure pulse applied to the divider 258 will trigger the flip-flop 251. In more particular, let it be assumed that the flip-flop 251 is in its binary "0" state. In this condition, the high pressure output from the binary "0" output of the flip-flop conditions gate 256 while the low pressure output from the binary "1" output inactivates gate 253. A high pressure input pulse arriving from the divider 258 is applied to both gates 253 and 256. This input pulse is blocked at gate 253 but passes through gate 256 to trigger flip-flop 251 to its "1" state. The binary "1" state conditions gate 253 and inactivates gate 256. Thus, the next high pressure input pulse from divider 258 will be blocked at gate 256 but will pass through gate 253 to trigger the flip-flop back to its binary "0" state. Accordingly, the flip-flop 251 will complete a cycle of operation for each two high pressure input pulses received. The stage therefore counts by two.

The other three stages of the A Register, which hold the second, third and fourth bits of a four-bit word, have similar interconnections and also similar modes of operations. The input pulses to each of the stages of the A Register, as will be explained, are derived from the corresponding bit positions of a word in the memory. That is, the input to the first stage of the A Register is derived from the first bit position of a word taken from the memory, the input to the second stage is derived from the second bit position of a word in the memory and so on.

The A Register in addition to receiving inputs from the memory is also manually settable from a keyboard. In more particular, each stage of the register has associated therewith a pair of set and reset keys K. The pair of keys K associated with each stage are coupled by means of a pair of suitable dividers to a pair of high pressure lines shown at 259 and 260 in Stage 1. The output side of the lines 259 and 260 are fed to one input of each of the "OR" gates 257 and 254 whereby manual operation of any set key will switch the corresponding flip-flop 251 or the like to its binary "1" state and manual operation of any reset key will switch the corresponding flip-flop to its binary "0" state.

Before describing in detail the connections which enable a memory word to be transferred to the A Register, the connections which enable the transfer of a word from the A Register back into the memory will be described. These connections were alluded to in the section above dealing with a write into the memory. As there indicated, the binary "1" and "0" outputs of the fourth stage of the A Register are fed through lines 250 and 249 to the binary "1" and "0" input control ducts respectively of all the fourth bit storage flip-flops in the memory 10. Line 250 is powered directly from the binary "1" output of the fourth stage flip-flop of the A Register. Line 249, on the other hand, is powered from an amplifier 261 connected between line 249 and the binary "0" output of the fourth stage flip-flop of the A Register. Amplifier 261 is inserted for design considerations and can be deleted if proper considerations are taken of the loading on the fourth stage flip-flop.

The connection between the third stage of the A Register and the third bit storage flip-flops in the memory includes a small delay element 262 and amplifier/inverter 263 connected to the binary "1" output of the third stage flip-flop. The non-inverting output of the amplifier/inverter 263 is coupled to all the binary "1" input ducts of all the third bit storage flip-flops as shown while the inverting output is connected to all the binary "0" input conrol ducts of the third bit storage flip-flops. A similar connection including a small delay element 264 and amplifier/inverter 265 is made between the second stage of the A Register and the second bit storage flip-flops of the memory. The delay elements 252, 255, 262 and 264 may all be equal to one another and be slightly longer than the duration of a clock pulse ($T_p$) as will become more obvious as the description proceeds. Finally, all the first bit storage flip-flops of the memory are directly connected, as shown, through an amplifier/inverter 266 to the binary "1" output of the first stage of the A Register. The purpose of delay elements 262 and 264 in the connection of the second and third stages of the A Register to the Memory 10 and omission of such delays in the connections of the first and the last stages of the A Register to the Memory will be explained hereafter.

The connection of the output of the Memory 10 to the input of the A Register 11 and the operation of the A Register to perform an addition will now be described by reference to FIGURES 12*c* and 13. An addition operation is a two step operation. During the first step, which occurs during the "00" state of the Step Counter 17, an augend is taken from the Memory and added to an addend stored in the A Register without carry propagation. During the second step, which occurs during the "01" state of the Step Counter 17, the carry generated during the first step is propagated and the corrected result is stored in the A Register.

Turning now to FIGURES 12*c* and 13, it will be seen that the (1) control line from the Function Select 16 is connected through a line 267 and divider 268 to the input of a pair of NOR gates 269 and 270. As will be described, the pressure on the (1) control line is normally high except it goes to a low pressure level as shown by Waveform H, FIGURE 13, during the "00" state of the Step Counter 17 whenever an add operation is to be performed. The other input to these NOR gates is derived from the negative output $Tp-c$ line 112 and $Tp-d$ line 114 of the clock 19. Thus during an add operation, and when the Step Counter 17 is in its "00" state the high output pressure from the NOR gates 269 and 270 switches during the clock pulse from the non-inverting output to the inverting output. The non-inverting output from NOR gate 269 feeds one input of a second NOR gate 271, the other input to which is taken from the $\overline{M1}$ line of the Memory 10. The pressure on the $\overline{M1}$ line is low whenever the first bit being read out of the Memory 10 is a binary "1" and is high whenever the first bit of the word being read out of the Memory is a binary "0." The inverting output of the NOR gate 271 is coupled to the input divider 258 associated with the first stage of the A Register. Thus, if the first bit of the augend is a binary "1" the pressure on line $\overline{M1}$ is low and at clock time during the first step of the add operation the pressure on the non-inverting output from the NOR gate 269 drops low and a high pressure input pulse equal in duration to the clock pulse is applied to the first stage of the A Register.

When the high pressure output from NOR gate 269 switches to its inverting output during clock time in the first step of an add operation, the high pressure then appearing on line 272 conditions an input "AND" gate 273 which receives as its other input the M2 output from the Memory. The output of the "AND" gate 273 is fed through an "OR" gate 274 to the input divider of the second stage of the A Register. Thus, if the second bit of the augend is a binary "1," the M2 line will be at a high pressure level and will be gated through the "AND" gate 273 and the "OR" gate 274 to the second stage of the A Register.

The third and fourth bits of the augend are similarly gated into third and fourth stages of the A Register via the input "AND" gates 275 and 276 and the "OR" gates 277 and 278. The input "AND" gates 275 and 276 receive the M3 and M4 outputs respectively from the Memory 10 as one input. The other input to these gates is derived from the inverting output of the "NOR" gate 270. Thus, during clock time in the first step of an ADD operation, the high pressure output from "NOR" gate 270 switches to its inverting output to condition gates 275 and 276 and then gate the pressure levels on the M3 and M4 lines through gates 275 and 276 and "OR" gate 277 and 278 into the third and fourth stages of the A Register 11.

The second step of an add operation occurs when the Function Select Control Line (2E) drops to a low pressure. This occurs as indicated by Waveform I, FIGURE 13, only during the "01" state of the Step Counter 17 when an ADD operation is to be performed.

The (2E) control signal line is fed through line 279 to the inputs of a pair of "NOR" gates 280 and 281, the other inputs to which are obtained from the negative clock output. The negative clock pulse *Tp–d* is applied to "NOR" gate 280 and the negative clock pulse *Tp–c* is applied to "NOR" gate 281. With this connection the high pressure output from "NOR" gates 280 and 281 switches to the inverting outputs of these gates during the clock pulse time of second step of the ADD operation. The inverting output of the "NOR" gate 280 is fed to one input to a pair of delayed carry "AND" gates 282 and 282*a*. The other input to gate 282 is obtained from the output of a carry generate gate 284 associated with the first stage of the A Register. Gate 284 receives the binary "0" output of the first stage of the A Register and the M1 output line as its inputs. Gate 284 therefore generates an ouptput pulse during the second step of an ADD operation when and only when the first stage of the A Register is in its binary "0" condition and the first bit (M1) of the augend is a binary "1." Gate 284 thus will generate a carry if and only if the above conditions are met. During the clock pulse time of the second step (Counter 17 state 01), gate 282 is conditioned by the "NOR" gate 280 and if a carry is being generated by gate 284, a high pressure carry output pulse is produced by gate 282 and fed through the amplifier 285 to a high speed carry propagate line 286. The carry pulse on the high speed carry propagate line is coupled to the "OR" gate 274 of the second stage to trigger this stage in response to the carry generated by the first stage of the A Register.

The second and third stages of the A Register have carry generate gates 284*a* and 284*b* and delayed carry propagate gates 282*a* and 282*b* arranged and connected in the same way as the corresponding gates for the first stage.

The high speed carry line 286 is further connected to one input of an "AND" gate 287, the other input to which is taken from the binary "1" output of the second stage of the A Register. The purpose of "AND" gate 287 is to propagate the carry generated at the first stage of the A Register if the second stage is presently storing a binary "1." To this end, the output of gate 287 feeds a buffer amplifier 288 which in turn drives a continuation of the high speed carry line 286*a*. An output is taken from the line 286*a* via "OR" gate 277 and applied to the input of the third stage of the A Register and also drives another gate 287*a* similar in operation and function to gate 287.

The detailed description of the operation of the A Register 11 and the Carry Register 11*a* will be reserved for the section below which describes the operation of an ADD instruction. Before leaving this section, however, the function of the delay elements 252 and 255, and all similar delay elements in the A Register and the function of delay elements 262 and 264 will be described.

The binary counter delay elements 252 and 255 and the like are used to prevent double counting by the counters during an input pulse. That is, the input pulses to the counter stages of the A Register are equal in duration to the clock pulses while the delays 252 and 255 are slightly longer than the clock pulses. Thus, an input pulse to a counter will trigger a counter to its new condition and then disappear from the input before the delays 252 and 255 will permit this new set condition to be felt by the input gates 253 and 256.

The delays 262 and 264 are added for a similar reason with respect to the operation of the High Speed Carry line gates 287 and 287*a*. That is a carry pulse appearing, for example, on line 286 must be able to trigger the second stage of the A Register and then disappear before the new setting is effective on gate 287. For this reason, delays 262 and 264 are made slightly longer than the carry pulse.

*Function Select 16*

The last component to be described before describing the overall operation of the system shown in FIGURES 12*a* to 12*f* will be the Function Select 16 which is shown in more detail in FIGURE 12*b* to which reference is now made.

The Function Select 16 comprises a gating matrix which is driven from the Step Counter 17 and the Instruction Decode 15. The gating matrix comprising the Function Select 16 functions in response to the action of the Step Counter 17 and the Instruction Decode 15 to selectively provide predetermined control pressures on a plurality of control lines. These lines are in turn coupled to the other components of the system so as to coordinate and sequence the operation of the system in a manner which permits the computer to sequence from instruction to instruction without manual intervention except as called for by the instruction sequence itself.

As shown in the illustrated example, the Function Select has 14 output control lines labeled (1), (2A), (2B), (2C), (2D), (2E), (2F), (3A), (3B), (3C), (3D), (4A), (4B) and (4C). Certain of these lines develop the desired control pressures once every cycle of the Step Counter while others will develop the desired control pressures only during the execution of specified instructions. In more particular, and as will be described, the desired control pressures are developed on control lines (2F), (3A), (3B), (3C), (3D), (4A), (4B) and (4C) once every cycle of the Step Counter; whereas the desired control pressures are developed on Control Lines (1) and (2E) only during the execution of an ADD instruction; on control lines (2A) and (2B) only during the execution of a Transfer Instruction; and on control lines (2C) and (2D) only during the execution of a jump instruction.

The first group of control lines to be considered will be those which develop a desired control pressure once every cycle of the Step Counter 17. Taking these lines up in numerical order, Control Line (2F) will be the first to be examined. This line, as will be recalled, is used during a Halt Instruction to control the setting of the main control flip-flop 137 in the Manual Control Component 18. The Control Line (2F) is said to be selected or activated when and only when its output pressure is at a high level. To this end, the Control Line (2F) is driven from the non-inverting output of a one input amplifier 289. The input control for amplifier 289 in turn is taken from the inverting output of a two input "NOR" gate 290, which has one input connected through a small delay 291 to the non-inverting output of amplifier 124 which itself is connected to the binary "0" output of stage 118 of Step Counter 17. The other input to the "NOR" gate 290 is connected through a small delay 292 to the binary "1" output of the Step Counter 119. Thus, both inputs to gate 290 will be low when and only when Step Counter 119 is in its binary "0" state and Step Counter 118 is in its binary "1" state or the Step Counter 17 is said to be in its (01) state. Accordingly, when both inputs to gate 290 are low, the inverting output from gate 290 will be high and the output pressure on the (2F) line will be high. Control line (2F) is thus activated once every cycle of the Step Counter 17 during its (01) state as shown in FIGURE 13 by Waveform B.

The next control lines to be considered will be the (3A), (3B), (3C) and (3D) lines. The (3A) and (3B) control lines, as will be recalled, are used to advance the Control Counter 13 by one in preparation for the selection of the next instruction. The (3C) and (3D) control lines are used, also as previously explained, to clear the Instruction Decode 15 and the Static Register 14 in preparation for the receipt of the next instruction. The (3A) to (3D) lines are said to be activated when and only when their output pressure is at a high level. This occurs when the Step Counter 17 reaches its (11) state. To this end, the (3C) and (3D) lines are connected to the non-inverting outputs of a pair of amplifiers 293 and 294 the input to which is obtained from the inverting output of a "NOR" gate 295. One input to the "NOR" gate 295 is obtained via the delay 291 from the non-inverting output of amplifier 124 connected to the binary "0" output of Step Counter 118. The other input to the "NOR" gate 295 is obtained via delay element 296 from the non-inverting output of amplifier 132 connected to the binary "0" output of counter stage 119 of the Step Counter 17. Thus, when Step Counter 17 is in its (11) state and only then will both of the inputs to the "NOR" gate 295 be low. When both inputs to "NOR" gate 295 are low, the output pressure from the inverting line of gate 295 will be high and therefore the output pressures on control lines (3C) and (3D) will be high as shown by Waveform D of FIGURE 13.

Now to consider the (3A) and (3B) control lines. These lines are driven from the inverting outputs of a pair of "NOR" gates 297 and 298. The inputs to these two gates are derived from the non-inverting output of "NOR" gate 295 and the negative clock signal *TP—A* as shown. When and only when both the inputs of Gates 297 and 298 are low will the output pressures on lines (3A) and (3B) be high. This condition obviously only occurs during the clock pulse time when the Step Counter 17 is in its (11) state as shown by Waveform C FIGURE 13.

The final three control line signals to be periodically generated once each cycle of the Step Counter are the (4A), (4B) and (4C) signals. As previously explained, the (4A) and (4B) control signals are used to gate the new instruction bits into the Static Register 14 and the Instruction Decode 15, while the (4C) signal is used to selectively gate the Control Counter 13 setting or the address bits M2 and M1 stored in the Static Register into the Memory Select 12.

The (4C) signal which will be the first of the signal lines to be examined is normally low and is driven to its high pressure condition only during the (10) state of the Step Counter 17 as shown by Waveform F, FIGURE 13, as will now be explained. Similarly, the (4A) and (4B) signal lines normally exhibit a low pressure condition and are driven to their high pressure level only during the (10) state of the Step Counter. To this end, the (4C) line is connected to the inverting output of a "NOR" gate 299. One input to the "NOR" gate is connected through a delay element 300 to the binary "1" output of the 118 Counter stage of the Step Counter 17. The other input to the "NOR" gate 299 is taken via delay element 296 from the non-inverting output of Amplifier 132 connected to the binary "0" output of counter stage 119 of the Step Counter 17. Thus, when and only when both inputs to "NOR" gate 299 are low will the output pressure on line (4C) be high. This occurs when Counter Stage 118 is in its binary "0" state and Counter Stage 119 is in its binary "1" state, or when the Step Counter 17 is said to be in its (10) state.

The (4A) and (4B) lines are driven from the inverting outputs of a pair of "NOR" gates 301 and 302, the inputs to which are derived from the non-inverting output of the "NOR" gate 299 and the negative clock pulse line (*TP—B*). The (4A) and (4B) signals will be high therefore when and only when both inputs to the "NOR" gates 301 and 302 are low. This occurs only during the clock pulse time of the (10) state of the Step Counter 17 as shown by Waveform E FIGURE 13.

Those control lines which are picked up or activated when a specific instruction is being executed will now be examined. The first of these lines is the (1) control line. This line, as previously described, is used to gate the augend into the A Register 11 and is said to be activated when its output pressure is low. Its output pressure is only low, as will presently be explained, during the (00) state of the Step Counter 17 when an ADD instruction is being executed. In more particular, the (1) control line is connected to the non-inverting output of a first "NOR" gate 303 the inputs to which are derived respectively from the non-inverting output of a second "NOR" gate 304 and from the A1 instruction line in the Instruction Decode 15. The A1 instruction line from the Decode is at a low pressure when and only when an ADD instruction (Code 01) has been staticized in the Instruction Decode as shown by Waveform G, FIGURE 13. The inputs to the second "NOR" gate 304 are obtained respectively from the non-inverting output of a third "NOR" gate 305 and the binary "1" output of the main control flip-flop 137 of the Manual Control 13. The Main Control flip-flop 137 is normally set to its binary "0" condition so that the binary "1" output from this flip-flop is normally in its low pressure condition. The inputs to the third "NOR" gate 305 are derived from the binary "1" output of stages 118 and 119 respectively of the Step Counter 17 via delay elements 300 and 292. As thus connected, the non-inverting output from the third "NOR" gate 305 will be low when and only when both of its inputs are low. This condition occurs when and only when the (00) state of the Step Counter 17 prevails. Similarly, the non-inverting output from the second "NOR" gate 304 will be low when and only when both of its inputs are low. This occurs when and only when the Main Control flip-flop 137 is set to its binary "0" state and when the Step Counter 17 is in its (00) state. Finally, the Control Line (1) will exhibit a low pressure condition when and only when the A1 instruction line is in its low state, and the Main Control flip-flop 137 is in its binary "0" state and when the Step Counter 17 is in its (00) state as shown by Waveform H, FIGURE 13. At all other times the output pressure from the (1) control line will be high.

The next control lines to be examined will be the (2A) and (2B) lines which are the lines used by the Memory 10 during a Transfer (or Write) order to interrupt the power jets of a selected memory word as previously explained. The control pressures on these lines are normally high, but are driven to their low pressure level during the (01) state of the Step Counter 17 when a Transfer (or T) instruction is being executed as shown by Waveform N, FIGURE 13. To this end, the (2A) and (2B) lines are connected to the non-inverting outputs of a pair of "NOR" gates 306 and 307 the inputs to which are derived respectively from the T instruction line of the Instruction Decode 15 and the non-inverting output of the "NOR" gate 290. The T instruction line in the Instruction Decode 15 normally exhibits a high pressure except when a Transfer Instruction (Code 10) has been staticized in the Instruction Decode 15. When this occurs the T line 164 develops a low pressure as previously explained and as shown by Waveform M, FIGURE 13. Thus when the Step Counter 17 reaches its (01) state the non-inverting output from the "NOR" gate also goes low. During this step of the Step Counter 17 both inputs to the "NOR" gates 306 and 307 are low and the pressure developed on lines (2A) and (2B) are low. At all other times the pressure on the control lines (2A) and (2B) are high.

The next control line to be examined will be the (2E) line. This control line is also used during an ADD operation as previously explained to carry the gate through the adder or A Register. This line is said to be activated when its pressure is low. The (2E) line is connected to the non-inverting output of a "NOR" gate 308 the inputs to which are derived from the A2 instruction line 167 of the Instruction Decode 15 and the inverting output of the amplifier 289. The A2 instruction line 167 in the Decode 15 like the A1 line goes low only when an ADD instruction has been staticized in the Instruction Decode 15, and the inverting output from amplifier 289 goes low only during the 01 state of the Step Counter 17. Thus the (2E) line goes low and is said to be activated only during the (01) step of the Step Counter 17 when an ADD instruction is being executed as shown by Waveform I, FIGURE 13.

The final control lines to be discussed are the (2C) and (2D) control lines. These lines are used, as will be explained, during the execution of a Jump (or J) instruction to gate the address bits stored in the Static Register 14 into the Control Counter 13 to thereby effect a transfer of control. The actual transfer of control is a so-called conditional transfer which occurs if and only if the contents of the A Register at the time of the instruction execution is not zero. These lines are said to be activated when and only when they exhibit a high pressure output.

The (2D) line is connected to the inverting output of a "NOR" gate 309, while the (2C) line is connected to the inverting output of an amplifier 310 the input to which is derived from the non-inverting output of "NOR" gate 309. One input to the "NOR" gate 309 is derived from the output of a magnitude comparator, as will be explained, and the other input to gate 309 is derived from the non-inverting output of a "NOR" gate 311. The inputs to "NOR" gate 311 are derived respectively from the J instruction line 165 of the Instruction Decode 15 and the inverting output of amplifier 289 as shown. The J instruction on line 165 goes low whenever a jump instruction is staticized in the instruction Decode 15 as shown by Waveform K, FIGURE 13, and the inverting output from inverter 289 goes low during the 01 step of the Step Counter 17. The non-inverting output from "NOR" gate 311 will be low only when both inputs to this gate are low. This will obviously occur only during the 01 step of the Step Counter 17 when a jump (or J) instruction is being executed. Similarly, control lines (2C) and (2D) will only be high as shown by waveform L, FIGURE 13 when both inputs to "NOR" gate 309 are low. This occurs only when the non-inverting output from "NOR" gate 311 is low as aforesaid and when the output of the Magnitude Comparator is low. The output of the Magnitude Comparator will be low, as will now be described, only when the contents of the A Register is not zero.

The Magnitude Comparator comprises three "AND" gates 312, 313 and 314 connected in series. The inputs to the first "AND" gate is taken from the $\overline{A4}$ and $\overline{A3}$ or binary "0" outputs of the third and fourth stages of the A Register. The inputs to the second "AND" gate 313 is taken from the output of the first "AND" gate 312 and from the $\overline{A2}$ or binary "0" output of the second stage of the A Register. Finally, the inputs to the third "AND" gate 314 is taken from the output of the second "AND" gate 313 and the $\overline{A1}$ or biary "0" output of the first stage of the A Register 11. The output from the third "AND" gate 314 is connected to one input of the "NOR" gate 309. From the described connections, it will be readily apparent that the output from the final gate 314 will always be low except when all the inputs $\overline{A4}$, $\overline{A3}$, $\overline{A2}$, $\overline{A1}$ are high, and that this condition will occur when and only when the A Register stores a binary "0" i.e. all four flip-flops are in their zero states. In other words, the pressure on control lines (2C) and (2D) will only go high during the (01) state of the Step Counter 17 when a jump instruction is being executed and then only when the value stored in the A Register is not zero.

Before leaving the description of the Function Select 16, it should be noted that some of the control lines such as (2A) and (2B) and (2C) and (2D) etc. are paired only for the purpose of permitting the use of small powered standard size driving elements and that single control lines could be substituted if higher powered driving elements were used.

The purpose of the delay elements 291, 292, 296 and 300 is to delay the actuation of the Function Select Control lines, such as the Control Line (1), (2), etc. from the time that the Step Counter 17 is advanced by a clock pulse for a period which is substantially equal to the duration of the clock pulse itself. Thus, the delays provided by these elements are all preferably equal to one another and to approximately the duration of a clock pulse. In more particular, if the actuation of a control line such as line (1) occurs too fast, a gate such as the "NOR" gate 269 will then let the present clock pulse pass therethrough and the next successive clock pulse as well. This would cause, in the case of gate 269, an augend to be entered twice into the A Register.

*Operation*

Having described in detail the components of the system and their operation, the operation of the entire computer in carrying out a few typical routines will now be described.

*Load.*—To prepare the computer for carrying out a routine, the first step to take is to load the Memory with the instructions to be performed and the data to be used in the routine. The first step taken in loading the memory is to set the computer to its "one instruction mode." This is done by the operator actuating the Key 21 in the Manual Control 18, FIGURE 12*a*. Actuation of Key 21 sets flip-flop 145 to its binary "1" state which in turn conditions the "AND" gate 141 via amplifier 143 as previously explained. Then when the Step Counter 17 reaches its 01 state the (2F) control line from the Function Select 16 goes high to produce an output from "AND" gate 141 thereby setting the main control flip-flop 137 to its binary "1" condition. When the main control flip-flop 137 is set to its binary "1" condition, the Step Counter 17 is disabled but does not halt its stepping until it reaches the 00 state as previously explained. Then when the Step Counter 17 halts its stepping the normal cyclic operation of the computer is interrupted. At this time the first instruction or word of data to be entered into the Memory is manually keyed into the A Register 11 by the operation of the set and reset keys K associated with the A Register. For example, assume that the first work to be entered into the memory is a numeric word corresponding to the decimal value 5 and it is to be loaded into the second word or (01) memory location in the memory. In this case, the set keys K for the first (A1) and third (A3) stages of the A Register 11 would be operated while the reset keys K for the second (A2) and fourth (A4) stages of the A Register 11 would be operated. This would set the binary code 0101 into the A Register. Next, the memory address (01) for this word would be set into the Static Register 14 by actuating the reset and set keys K respectively for the Static Register flip-flops 176 and 177. Then a transfer (T) instruction which is represented by the binary code (10) would be set in the Instruction Decode 15 by the manual actuation of the set and reset keys K respectively associated with the Instruction Decode flip-flops 153 and 154.

The foregoing steps operate to load the A Register with the data to be entered into the Memory, selects the Memory Address which is to receive this data word by way of the setting of the Static Register 14, and finally tells the computer by way of the transefr order set in the Instruction Decode 15 to transfer the word from the A Register into the Memory.

After the above steps have been taken, the operator actuates the start key 23 in the Manual Control 18. Actuation of the start key 23 sets the main control flip-flop 137 to its binary "0" state whereby the Step Counter 17 is released and permitted to start its normal stepping operation. The first clock pulse following the setting of the main control flip-flop 137 to its binary "0" state steps the Counter 17 to its 01 state whereby the (2F) line of the Function Select 16 is actuated. When the pressure in the (2F) line rises gate 141 again passes a signal to the main control flip-flop 137 to again reset this flip-flop to its binary "1" state. Step Counter 17 will thus step through one cycle and then stop.

While the Step Counter is sequencing through its cycle of operation and in particular while it is in its (01) state, the pressure on the (2A) and (2B) control lines will drop to their low level condition due to the fact that a transfer order has been staticized in the Instruction Decode 15. The low pressure on the Control Line (2A) together with the action of the Address Select "NOR" gate 224 in the Memory Select 12 will drop the pressure on the power jet lines of the 01 Memory location to thereby permit a write of the contents of the A Register into the Memory.

This completes the loading of the first word into the Memory. The second and all subsequent words are loaded into the Memory in the same way. That is, the word (instruction or data) is keyed into the A Register, a transfer instruction is keyed into the Instruction Decode 15 and the Memory Address to receive the word is keyed into the Static Register 14. The one instruction mode is followed all during the load operation and each word is loaded by operating the start key 23.

*Start.*—In loading the Memory, it is normal to put the instructions which comprise the routine in sequential order in the first portion of the Memory and the data to be operated on in the last portion of the Memory. It will be assumed that this has been done, and that the first instruction of the routine is loaded into the first word location (00) of the Memory and that it is now desired to start the computer. To start the computer, any suitable non-zero number is keyed into the A Register, a jump (J) instruction, designated by the code (11), is keyed into the Instruction Decode 15 and the Memory Address next preceding the starting address for the routine is keyed into the Static Register 14. In the assumed example where the first instruction is assumed to be in the first or (00) address location, the last or (10) address would be keyed into the Static Register 14. The jump instruction stored in the Instruction Decode 15 selects the J Line 165 in the Instruction Decode and this in turn conditions the "NOR" gate 311 in the Function Select 16 as previously explained.

The Manual Control 18 is then set to the continuous mode by actuating key 22. Then the Start key 23 is actuated and the Step Counter is again released for manual stepping. This time without interruption, since the continuous mode operation is in effect.

After the Step Counter has been released by actuation of the Start key 23 and when the Step Counter reaches its (01) state, the pressure on the control line (2C) and (2D) rises to its high level state, as previously explained. The (2C) and (2D) control lines cause the setting of the Static Register 14 (10 in this case) to be jammed into the Control Counter 13. Then when the Step Counter reaches its 11 state the count of the Control Counter is increased by one to now read 00. This is the address of the first instruction. Finally, when the Step Counter 17 advances to its 10 state, the (4C) signal gates the Control Counter setting out into the Memory Select to cause the first instruction to be staticized in the Instruction Decode 15 and Satic Register 14 in response to the (4A) and (4B) signals generated during the clock pulse time of this setting of the Step Counter. Thereafter, each instruction will be executed automatically and sequentially until a halt instruction is encountered. When a halt instruction is encountered, the machine stops and the operator must again operate the Start key 23 to start the machine again.

*Program #1.*—To better illustrate the operation and programming of the computer two typical programs will be assumed. The first program is designed to solve the equation:

$$x=2(3+4)$$

At the start of the program the memory and accumulator will be loaded as follows:

| | Word Address | Memory Bits 4 | 3 | 2 | 1 |
|---|---|---|---|---|---|
| Memory | Word #1 (00) | 0 | 1 | 1 | 0 |
| | Word #2 (01) | 1 | 0 | 0 | 0 |
| | Word #3 (11) | 0 | 1 | 0 | 0 |
| | Word #4 (10) | 0 | 0 | 1 | 1 |
| | Stages 4 3 2 1 | | | | |
| A Register | 0 1 0 0 | | | | |

As indicated by the above, the A Register stores the decimal number 4 at the start of the program. The first instruction which is stored in memory address #1 (Binary Code 00) is an ADD instruction. In particular, this instruction specifies the addition of the contents of memory location #4 to the A Register. Also, as indicated above, the decimal number 3 is stored in memory location #4. Thus, at the end of the first instruction, the accumulator stores the decimal value 7 and the program proceeds to the second instruction which is stored in memory location #2. The second instruction is a transfer instruction. In more particular, this instruction specifies that the contents of the A Register (now decimal value 7) be transferred to the word location #1 (00). Thus, at the end of the second instruction, the A Register stores the decimal value 7 as does the memory location #1. The program then proceeds to the third instruction which is stored in the third word location (11) of the memory. The Third instruction is also an ADD instruction. In more particular, this instruction specifies that the contents of memory location #1 (00) be added to the A Register. Thus, at the end of the third instruction the A Register stores the answer of the problem, namely, decimal value 14. At the end of the third instruction, the program proceeds to the fourth instruction which is stored in memory location #4 (10). The fourth instruction, as indicated by the above, is a halt instruction, the execution of which halts the computer and preserves the answer in the A Register.

*Program #2.*—This program may be classified more properly as a sub-routine which may be used to clear the A Register. This may be done by repeatedly adding an odd number to the A Register.

At the start of the program the memory and accumulator may be loaded as follows:

| | Word Address | Memory Bits 4 3 2 1 |
|---|---|---|
| Memory | #1 (00) | 0 0 X X |
| | #2 (01) | 0 1 0 1 |
| | #3 (11) | 1 1 0 0 |
| | #4 (10) | X X X X |
| | Stages | |
| Accumulator | 4 3 2 1<br>X X X X | |

In the above format the X's indicate an arbitrary arrangement of binary bits. The program starts with the instruction in word location #2 (01). The instruction in memory location #2 is an ADD instruction. In more particular, this instruction specifies the addition of the contents of memory location #2 to the A Register. Numerically, the instruction in word location 2 corresponds to a decimal 5. Thus, at the end of the first instruction, a decimal 5 has been added to the A Register and the program sequences to the next instruction. The next instruction is a jump instruction which jumps the computer to the first instruction if the contents of the A Register is not zero. These two instructions are continuously repeated until the contents of the A Register has been cleared to zero. When this occurs, the jump instruction permits the program to proceed to memory location 4 which may, for example, store a halt instruction.

*Output*

The output from the system can take many different forms. One typical output is shown in FIGURE 14 which provides an automatic print out of the A Register contents every time an ADD operation is performed.

In more particular, the print out shown in FIGURE 14 operates as an inking atomizer similar in principle to the atomizer shown in FIGURE 2 of the patent to Hollman 2,925,312. As shown in the figure, the print out system includes a continuously moving paper web 400 moved in the direction indicated by the arrow by a continuously moving capstan 401. Located adjacent the paper web is an ink reservoir 402 which supplies ink to each of four ink nozzles 403, 404, 405 and 406 connected to a common pipe 407 communicating with the ink reservoir 402. One ink nozzle is provided for each binary stage of the A Register.

Communicating with each of the ink nozzles 403 to 406 is a corresponding air nozzle 403*a* to 406*a*. Each of the air nozzles 403*a* to 406*a* is coupled to the inverting output of four corresponding "NOR" gates 403*b* to 406*b*. The tower jet inputs to each of the "NOR" gates is taken from the main air supply of the system. One of the control inputs to each of the "NOR" gates 403*b* to 406*b* is taken from a "print pulse generator" shown in the figure and the other control input to each of the "NOR" gates is taken from the barred output $\overline{A4}$, $\overline{A3}$, etc. of the A Register as shown. The barred outputs $\overline{A4}$, $\overline{A3}$, etc. exhibit low pressure states when their corresponding stages of the A Register are storing binary "1's" and high pressure states when their corresponding stages of the A Register are storing binary "0's." The "print pulse generator," as will shortly be described, generates a low pressure "print pulse" signal during the clock pulse time of the 11 state of the Step Counter 17 whenever an ADD operation has been performed. At all other times, the output of the print pulse generator exhibits a high pressure condition.

From the foregoing description, it will be seen that when the "print pulse" is generated the print pulse input to each of the "NOR" gates 403*b* to 406*b* will all go simultaneously low. Those "NOR" gates which are connected to stages in the A Register which are storing binary "1"s at this time will have their other control inputs low and a momentary jet of air will emerge from each of the corresponding air nozzles 403*a* to 406*a* to cause an ink mark to be deposited on the paper web 400. This will form a horizontal pattern of marks across the paper web which is indicative of the binary value stored by the A Register. In the figure, two typical patterns are shown. The top pattern representing a decimal 13 and the bottom pattern a decimal 7.

The operation of the rest of the apparatus shown in the figure to automatically generate a low pressure "print pulse" during an ADD operation will now be described. As shown in the figure the "Print Pulse Generator" is keyed from the inverting output of the "NOR" gate 308 in the Function Select 16. The inverting output of gate 308 goes high during the 01 step of the Step Counter 17 whenever an ADD operation is being performed. The high output is applied to an "AND" gate 408 together with a positive clock pulse TP+ from the Clock Generator 19. Thus, at the end of the 01 state of the Step Counter when an ADD operation is being performed, a high pressure signal emits from gate 408 to set a control flip-flop 409 to its binary "1" state as indicated. The binary "1" output from flip-flop 409 conditions a second "AND" gate 411 via the small delay 410. Delay 410 is in the order of a clock pulse in magnitude. Thus, gate 411 becomes permissive during the 11 state of the Step Counter 17. At the end of the 11 state of the Step Counter 17, a positive clock pulse also derived from the clock pulse generator 19 gates through "AND" gate 411 to apply a high pressure control input pulse to the amplifier/inverter 412. The inverting output from amplifier/inverter 412 goes low during this time and thus applies a "print pulse" to the print pulse inputs of "NOR" gates 405*b* and 406*b*. The simultaneously occurring high pressure output from the non-inverting output of amplifier/inverter 412 is inverted by the inverter 413 and its output in turn is applied as the print pulse to "NOR" gates 403*b* and 404*b*.

From the foregoing description it will be appreciated that a print pulse is generated only after an ADD operation has been completed, and that this print pulse is automatically generated whenever an ADD operation has been performed. The system therefore provides automatic read-out.

Although this disclosure has been limited for purposes of simplification to a certain specific embodiment, it is to be expressly understood that the invention is not to be limited except insofar as is indicated by the spirit of the attached claims.

The embodiments of the invention in which an exclusive property or privilege is claimed are defined as follows:

1. A fluid digital computer comprising, a fluid clock pulse source for generating periodic pressure pulses, a fluid step counter having $n$ number of states, fluid conduit means coupling said clock pulses to said counter to advance said counter through a cycle of operation every $n$ number of clock pulses, computer control means comprising a fluid instruction storage register, a fluid gating matrix and a plurality of fluid control lines, said gating matrix coupling the instruction register to said control lines and operative to develop on said control lines a pattern of fluid pressure signals according to the instruction stored in said storage register, said control lines being adapted to control the operation of the computer in accordance with the development of predetermined pressure levels on said control lines, and means coupling said step counter to said gating matrix to thereby cyclically control the development of said predetermined pressure levels on said control lines and thereby to cycle the operation of the computer.

2. The apparatus of claim 1 further comprising, a bi-stable fluid control coupled to said step counter and operative when in one control state to permit continuous cyclic operation of said step counter and when in the other state to stop the operation of the step counter.

3. The apparatus of claim 2 further comprising, a manual control for establishing said one control state or the other of said bi-stable fluid control.

4. The apparatus of claim 2 further comprising, a manual control for establishing said one control state of said bi-stable control and automatic means for selectively establishing the other state of said bi-stable fluid control.

5. An internally programmed fluid digital computer comprising, a multi-word addressable fluid memory adapted to store both data and instruction words, said instruction words having a command portion and a memory address portion, a fluid instruction decoder device coupled to the output of said memory for receiving and storing the command portion of an instruction word taken from the memory, a computer control means having a plurality of fluid pressure lines associated therewith, said fluid pressure lines being adapted to control the operation of the computer in accordance with the pressure levels developed on said lines, and fluid conduit means coupling said instruction decoder to said computer control means to thereby develop certain predetermined pressure levels on said pressure lines in accordance with the command portion of an instruction word stored in the decoder.

6. The apparatus of claim 5 further comprising a fluid clock pulse generator for generating periodic pressure pulses, a fluid step counter having $n$ number of states, a fluid conduit means connecting the step counter to the clock source so as to advance the step counter one count for each clock pulse, and means coupling the step counter to the computer control to cyclically control the development of predetermined pressures on said pressure lines and to thereby cycle the operation of the computer.

7. The apparatus of claim 6 further comprising an address select device coupled to said memory and operable in response to the receipt of coded input fluid pressure signals to read a word out of the memory at a memory address governed by the coded input pressure signals, a fluid control counter adapted to develop coded output pressure signals representative of the addresses in the memory, fluid conduit means coupling one of said pressure lines in said computer control to said control counter to step said control counter one count each cycle of the step counter, fluid gating means coupling the output of said control counter to the address select device, and fluid conduit means coupling another pressure line in said computer control to said fluid gating means to render said fluid gating means operative once each cycle of the step counter following the stepping of said control counter.

8. An internally programmed fluid digital computer comprising, a multi-word addressable fluid memory adapted to store both data words and instruction words, said instruction words having a command portion and a memory address portion, an address select device coupled to said memory and operable in response to the receipt of coded input fluid pressure signals to read a word out of the memory at a memory address governed by the coded input pressure signals, a computer control device having a plurality of output pressure lines on which are developed predetermined fluid pressure levels in accordance with the computer function to be performed, said computer control including first and second register means operable to store respectively, the address and command portions of an instruction word, means responsive to the command portion of an instruction word stored in said second register means to control the pressure levels developed on certain of said pressure lines, means responsive to the first register means in said computer control and to a predetermined pressure level on one of said pressure lines in said computer control to operate said address select device to read a data word from said memory, a fluid computation section, and means responsive to the pressure level developed on another of said computer control pressure lines to feed said data word to said computation section.

9. The apparatus of claim 8 wherein said computer control further comprises a control counter for generating coded fluid pressure signals representative of the address of an instruction word, and wherein there is included coupling means operative responsive to the pressure level on one of said pressure lines to apply the fluid pressure signals developed by said control counter to said address select device to read out an instruction word.

10. The apparatus of claim 9 wherein said computation section comprises a fluid accumulator register; fluid gating means coupling the first register means to said control counter, and means responsive to the establishment of a predetermined pressure on another of said pressure lines and to the numeric content of said accumulator register to transfer the coded address signal stored by said first register mean to said control counter.

11. The appartus of claim 6 further comprising a step counter control device coupled to said step counter and to the instruction decode device and responsive to a given command stored in the latter to actuate the step counter control device to stop further operation thereof.

12. An internally programmed fluid digital computer comprising a multi-word addressable fluid memory adapted to store both data words and instruction words, said instruction words having a command portion and a memory address portion, a first fluid register coupled to said memory and adapted to receive and store the command portion of an instruction word, a second fluid register coupled to said memory and adapted to receive and store the memory address portion of an instruction word, and a manual keyboard coupled to said first and second registers for manually setting said registers whenever desired.

13. The apparatus defined by claim 12 further comprising a fluid accumulator register coupled to said memory to receive data words read therefrom, and wherein said manual keyboard is further coupled to said accumulator register whereby the contents of said accumulator register may be manually controlled as desired.

14. An internally programmed fluid digital computer comprising a multi-word addressable fluid memory adapted to store both data words and instruction words, said instruction words having a command portion and a memory address portion, a first fluid register coupled to said memory and adapted to receive and store the command portion of an instruction word, a second fluid register coupled to said memory and adapted to receive and store the memory address portion of an instruction, an arithmetic section coupled to said memory for receiving and manipulating data words, a fluid control device coupled to said first register and responsive to the command stored in said register to control the operation of the computer, said control device including a cycling device operative to periodically clear the first and second registers of the information stored therein and to thereafter read the next instruction word from the memory.

15. The apparatus of claim 14 wherein the control device includes a pair of manually operable keys for starting and stopping the cycling device.

16. A fluid, digital computer comprising, a multi-word addressable fluid memory, a fluid address decoder coupled to said memory for reading a memory word out of any selected address in said memory, a fluid control counter for holding the address of an instruction word under execution by the computer, a fluid step counter having a plurality of states, a fluid clock pulse source for generating periodic pressure pulses coupled to said step counter to cyclically advance said step counter through its plurality of states one state at a time, means coupling said step counter to said control counter to advance said control counter one step each cycle of the step counter in response to the establishment of a first state of said step counter, and fluid gating means coupling the output of said control counter to said fluid address decoder in response to the establishment of a second and succeedent state of said step counter.

17. In combination, a multi-stage fluid register for the storage of a binary coded word, said register including a plurality of fluid-flip-flop devices, one for each binary bit of a word, each of said flip-flops having a pair of output ducts, said flip-flops being further adapted to provide a high pressure condition in one output duct or the other in dependence upon the binary state of the flip-flop; a multi-word memory section comprising a first plurality of fluid storage-flip-flops each having a main fluid power input duct for carrying a power jet and a pair of output ducts into which the main power jet may selectively exit, each of said storage flip-flops comprising a pair of input control ducts communicating with the main power jet and operable to carry control jets which function when the main power jet is momentarily interrupted to cause the power jet to exit from one output duct or the other in dependence upon the relative pressure conditions present in the control ducts, a first fluid connection coupling one of the output ducts of the last stage of the register to one input control duct of each of said plurality of storage flip-flops, a second fluid connection coupling the other output duct of the last stage of the register to the other input control duct of each of said plurality of storage flip-flops, a similar plurality of storage flip-flops for each of the other stages of the register, a similar set of connections between each of the stages of the register and the input control ducts of the corresponding plurality of storage flip-flops; and control means coupled to the main power input ducts of all of the storage flip-flops for simultaneously and momentarily interrupting the main power jets to one flip-flop from each of said plurality of storage flip-flops whereby the binary coded word held by said register is transferred to a selected group of said storage flip-flops.

18. A fluid pulse generator comprising, a fluid oscillator device having first and second output channels capable of delivering phase opposed, cyclically recurring pressure signals from said output channels, a fluid gating device having at least two input channels and at least one output channel, said fluid gating device being operative to deliver a predetermined output pressure signal whenever the input pressure levels on said at least two input channels thereof are in a predetermined relationship to one another, and means coupling the two outputs of said oscillator device to respective ones of said at least two input channels of said gating device, said last-named means operating to insert a phase shift to one of the oscillator signals coupled to said gating device.

19. A fluid pulse generator as set forth in claim 18 wherein said last-named means includes a fluid pressure delay device for inserting the phase shift.

20. A fluid pulse generator as set forth in claim 18 wherein said gating device comprises a fluid NOR gate.

21. A fluid pulse generator comprising, a fluid gating device having a pair of input channels and at least one output channel, said gating device being operative to produce a predetermined output signal when the input pressure applied to the input channels of said gating device are both at similar predetermined levels, a first fluid pressure line coupled to one input channel of said gating device, means normally charging said first line with a fluid at a pressure level other than said predetermined level, a second fluid pressure line coupled to the other input channel of said gating device, a fluid pressure inverter, a fluid delay element, said inverter and delay element coupling said first line to said second line and providing said second input channel with a fluid pressure level corresponding to said predetermined level, and means for switching the pressure level in said first line to said predetermined pressure level whereby said gating device will produce said predetermined output signal having a duration corresponding to the delay interval of said delay element.

22. The structure set forth in claim 21 wherein the last-named means include a manually controlled key.

23. A fluid pulse generator comprising, a fluid gating device having a pair of input channels and at least one output channel, said gating device being operative to produce a predetermined output pulse when the input pressure applied to the input channels of said gating device are both at similar predetermined levels, a first fluid pressure line coupled to one input channel of said gating device, means normally charging said first line with a fluid at a pressure level other than said predetermined level, a second pressure line coupled to the other input channel of said gating device, means for charging said second line with a fluid pressure level corresponding to said predetermined level, and means for switching the pressure level in said first line to said predetermined level and thereafter switching the pressure level in said second line to a level other than said predetermined level, said last-named means being operative to provide a predetermined delay in the switching of the pressures in said first and second lines.

24. A fluid digital computer comprising, a fluid memory adapted to store binary coded, bit parallel operands, a plurality of memory output lines, one for each bit of a stored operand, a control device for reading an operand out of said memory onto said memory output lines, an accumulator for receiving said operands, said accumulator comprising a multistage fluid register having one stage for each bit of an operand, each stage including a fluid binary counter device having a binary "1" output duct and a binary "0" output duct and an input duct for triggering the binary counter, means coupling each memory output line to the corresponding input duct of each stage of the register, a fluid carry generate gate for each stage of the register except the last, each said carry generate gate comprising a pair of input ducts and an output duct, means coupling one of the input ducts of each of said carry gates to a corresponding one of the operand lines, means coupling the other input duct of each of said carry generate gates to the binary "0" output of the associated binary counter stage, means coupling the output from each carry generate gate to the input duct of next succeeding binary counter stage of the register, a fluid carry propagate gate associated with each stage of the register except the first and last, each of said carry propagate gates having a pair of input ducts and an output duct, means coupling one input duct of each carry propagate gate to the output of the carry generate gate associated with the previous stage of the register, means coupling the other input duct of each carry propagate gate to the binary "1" output of the associated binary counter stage of the register, and means coupling the output of each carry propagate gate to the input of the next succeeding binary counter stage of the register.

25. An accumulator for a bit parallel digital fluid computer comprising, a multistage fluid register having one stage for each bit of a binary coded operand, each stage comprising a fluid binary counter device having a binary "1" output duct and a binary "0" output duct and an input pressure line for triggering the binary counter, a plurality of fluid pressure operand lines, one for each bit of an operand, a fluid carry generate gate for each stage of the register except the last, each said carry generate gate comprising a pair of input ducts and an output duct, means coupling one of the input ducts of each of said carry gates to a corresponding one of the operand lines, means coupling the other input duct of each of said carry generate gates to the binary "0" output of the associated binary counter stage, means coupling the output from each carry generate gate to the input duct of next succeeding binary counter stage of the register, a fluid carry propagate gate associated with each stage of the register except the first and last, each of said carry propagate gates having a pair of input ducts and an output duct, means coupling one input duct of each carry propagate gate to the output of the carry generate gate associated with the previous stage of the register, means coupling the other input duct of each carry propagate gate to the binary "1" output of the associated binary counter stage of the register, and means coupling the output of each carry propagate gate to the input of the next succeeding binary counter stage of the register.

26. A system as set forth in claim 24 wherein the means for coupling the output from each carry generate gate to the input duct of the next succeeding stage of the register includes a gating element which is operated by the control device.

References Cited by the Examiner

UNITED STATES PATENTS

| | | | |
|---|---|---|---|
| 3,001,698 | 9/61 | Warren | 235—201 |
| 3,093,306 | 6/63 | Warren | 235—201 |
| 3,107,850 | 10/63 | Warren | 235—201 |
| 3,128,039 | 4/64 | Norwood | 235—201 |

LEO SMILOW, *Primary Examiner.*

UNITED STATES PATENT OFFICE
CERTIFICATE OF CORRECTION

Patent No. 3,190,554 June 22, 1965

Arthur J. Gehring, Jr., et al.

It is hereby certified that error appears in the above numbered patent requiring correction and that the said Letters Patent should read as corrected below.

Column 8, line 61, for "or" read -- of --; column 9, line 68, for "20" read -- 120 --; column 14, line 64, for "is and" read -- and is --; column 18, line 26, for "24" read -- 224 -- lines 62 and 64, for "instread", each occurrence, read -- instead --; column 19, line 20, strike out "lines", second occurrence; column 20, line 6, for "SB2" read -- S4B2 --; column 22, line 35, for "conrol" read -- control --; column 23, line 64, for "ouptput" read -- output --; column 25, line 68, for "of" read -- to --; column 27, line 32, for "carry the gate" read -- gate the carry --; column 28, line 19, for "biary" read -- binary --; line 41, for "(2)" read -- (2E) --; column 29, line 7, for "work" read -- word --; column 31, line 68, for "tower" read -- power --.

Signed and sealed this 7th day of December 1965.

(SEAL)
Attest:

ERNEST W. SWIDER
Attesting Officer

EDWARD J. BRENNER
Commissioner of Patents